US007623478B2

(12) United States Patent
Froc et al.

(10) Patent No.: US 7,623,478 B2
(45) Date of Patent: Nov. 24, 2009

(54) METHOD AND DEVICE OF RESOURCE ALLOCATION

(75) Inventors: Gwillerm Froc, Rennes (FR); Corinne Rosier, Betton (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 608 days.

(21) Appl. No.: 11/129,339

(22) Filed: May 16, 2005

(65) Prior Publication Data

US 2005/0259583 A1    Nov. 24, 2005

(30) Foreign Application Priority Data

May 19, 2004    (EP) .................................. 04291286

(51) Int. Cl.
*H04B 7/005* (2006.01)
*H04L 12/28* (2006.01)
*H04J 3/00* (2006.01)
*H04B 7/212* (2006.01)
*H04J 3/22* (2006.01)
*H04L 1/14* (2006.01)

(52) U.S. Cl. .................. 370/278; 370/252; 370/336; 370/347; 370/468; 714/750

(58) Field of Classification Search .................. 370/235; 714/748

See application file for complete search history.

(56) References Cited

U.S. PATENT DOCUMENTS

| 5,163,046 A | * | 11/1992 | Hahne et al. ................. 370/237 |
| 5,477,550 A | * | 12/1995 | Crisler et al. ................ 714/748 |
| 6,069,886 A | * | 5/2000  | Ayerst et al. ................. 370/336 |
| 6,415,410 B1 | * | 7/2002 | Kanerva et al. ............. 714/749 |
| 7,058,027 B1 | * | 6/2006 | Alessi et al. ............. 370/310.1 |
| 2002/0080719 A1 | * | 6/2002 | Parkvall et al. ............. 370/235 |
| 2005/0039101 A1 | * | 2/2005 | Torsner ....................... 714/748 |
| 2006/0092972 A1 | * | 5/2006 | Petrovic et al. ............. 370/469 |

FOREIGN PATENT DOCUMENTS

| EP | 0 768 806 A2 | 4/1997 |
| EP | 1 111 832 A2 | 6/2001 |
| WO | WO 02/45330 A2 | 6/2002 |
| WO | WO 0245330 A2 | * 6/2002 |

\* cited by examiner

*Primary Examiner*—Daniel J. Ryman
*Assistant Examiner*—Cassandra Decker
(74) *Attorney, Agent, or Firm*—Oblon, Spivak, McClelland, Maier & Neustadt, L.L.P.

(57) ABSTRACT

There are in a network comprising at least one transmitter transmitting PDUs according to an ARQ protocol, one receiver receiving transmitted PDUs and acknowledging PDUs with FeedBack Information (FBI) message(s), and a Radio Resource Management (RRM) unit allocating resource based on a TDMA scheme providing series of Time Frames (TFs). The transmitter sends PDUs to the receiver and manages a transmitter ARQ sliding window. The receiver sends back one or more FBI messages to the transmitter and manages a receiver ARQ sliding window. The transmitter, upon reception of FBI message, updates its ARQ sliding window according to received feedback acknowledgement status information, and retransmits PDUs based on its ARQ sliding window.

The RRM unit receives FBI messages and manages an extended ARQ sliding window updated according to them. The RRM unit allocates an amount of forward resource and an amount of backward resource, computed based on the extended ARQ sliding window, to the transmitter.

17 Claims, 17 Drawing Sheets

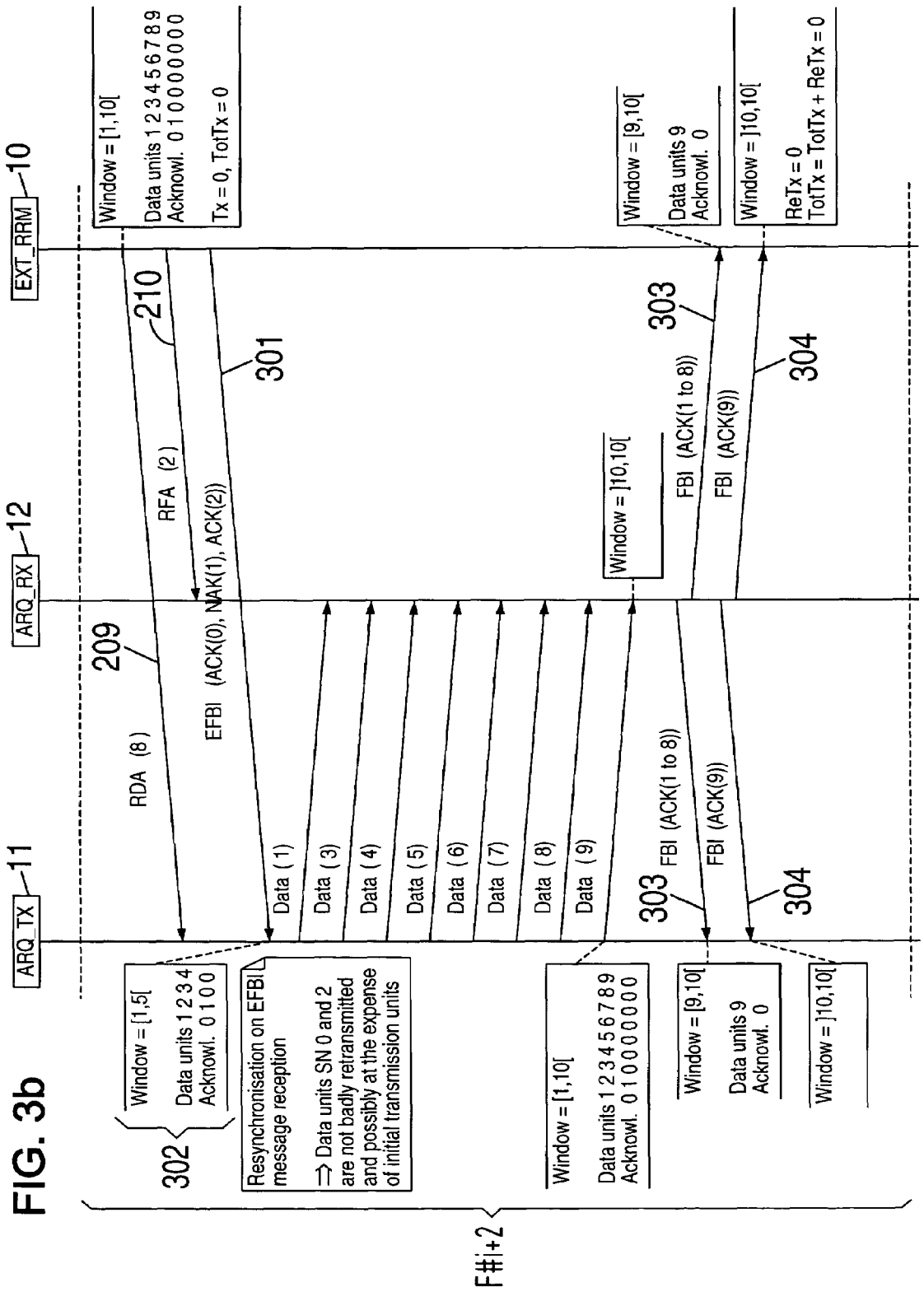

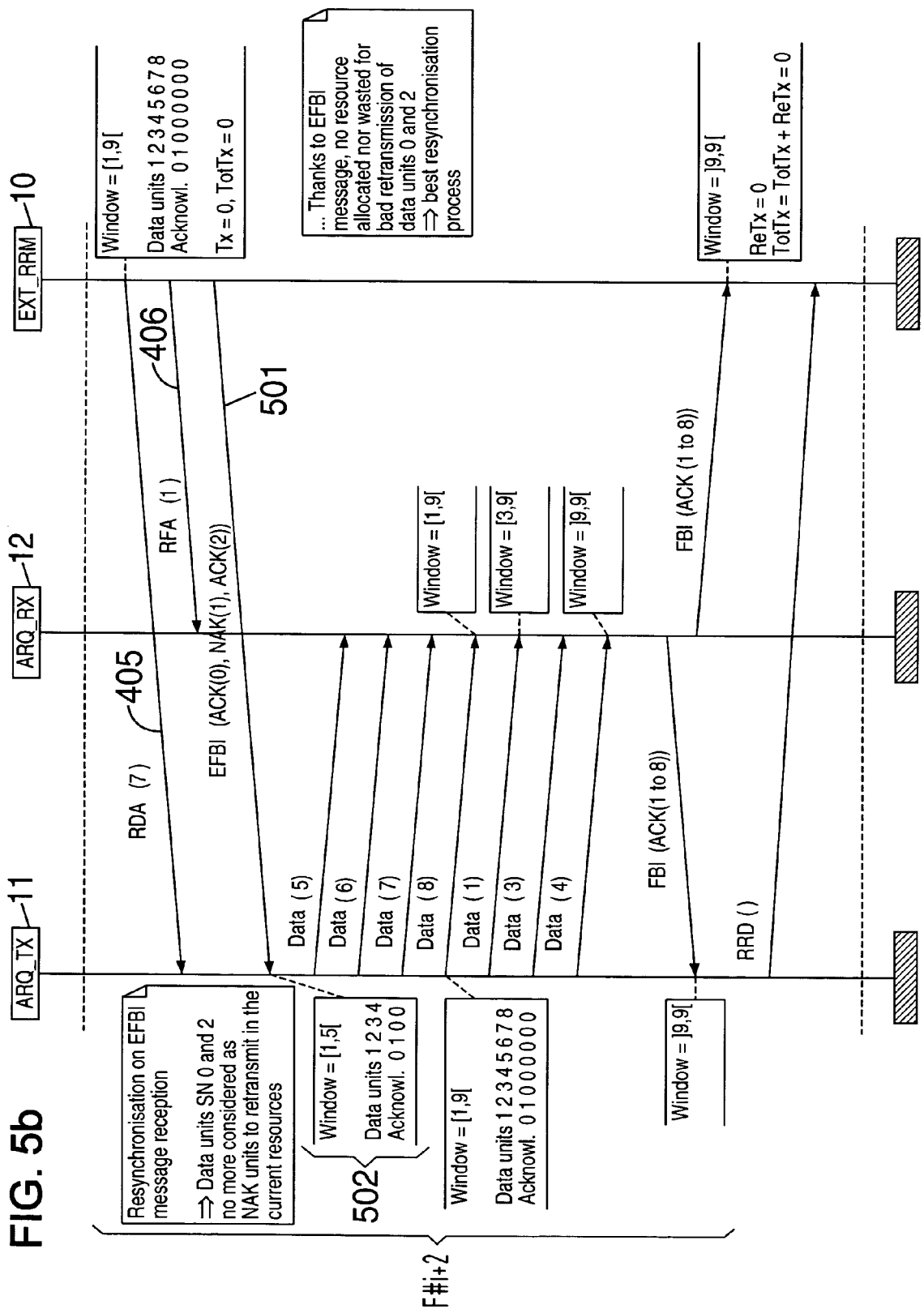

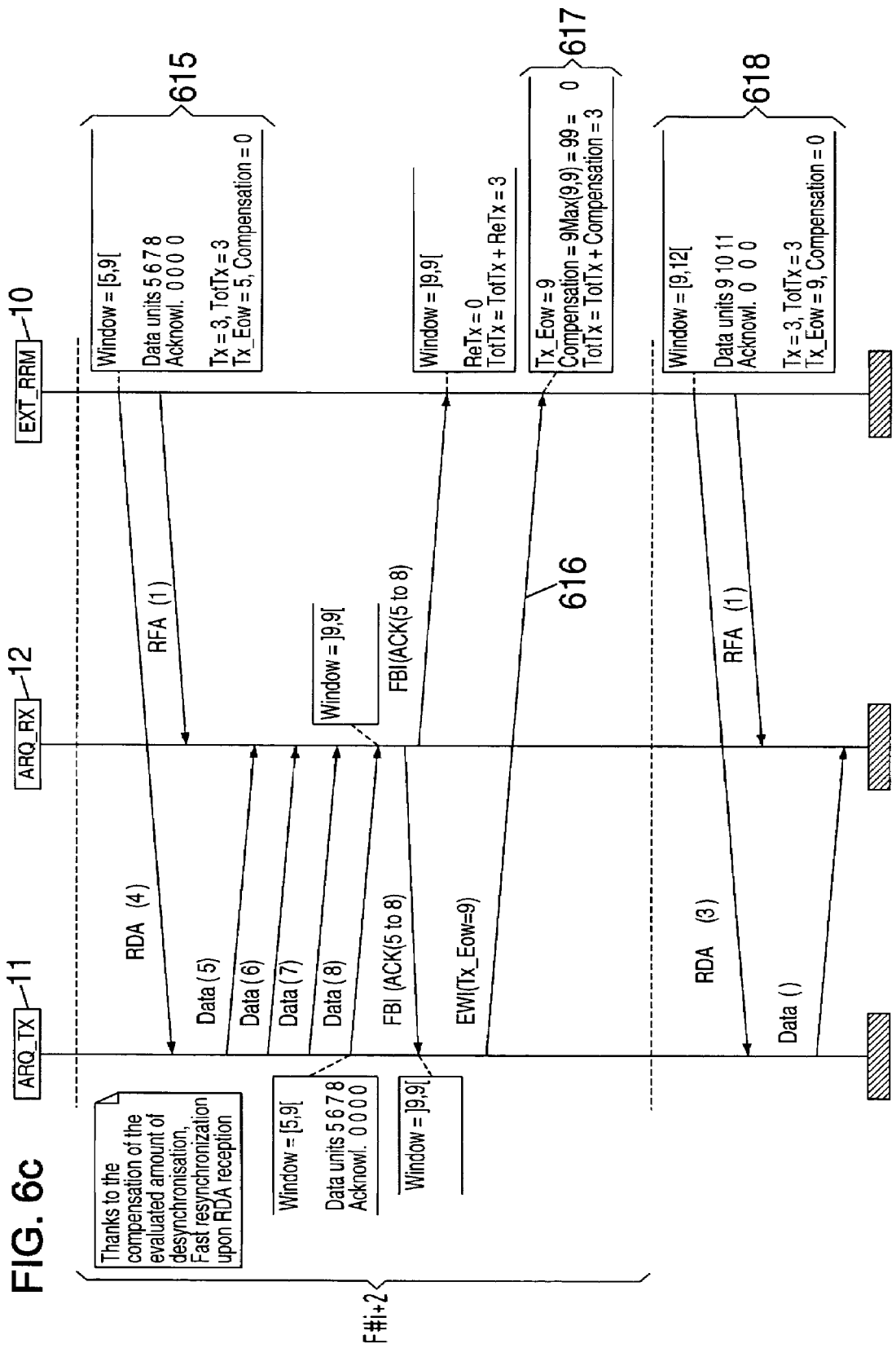

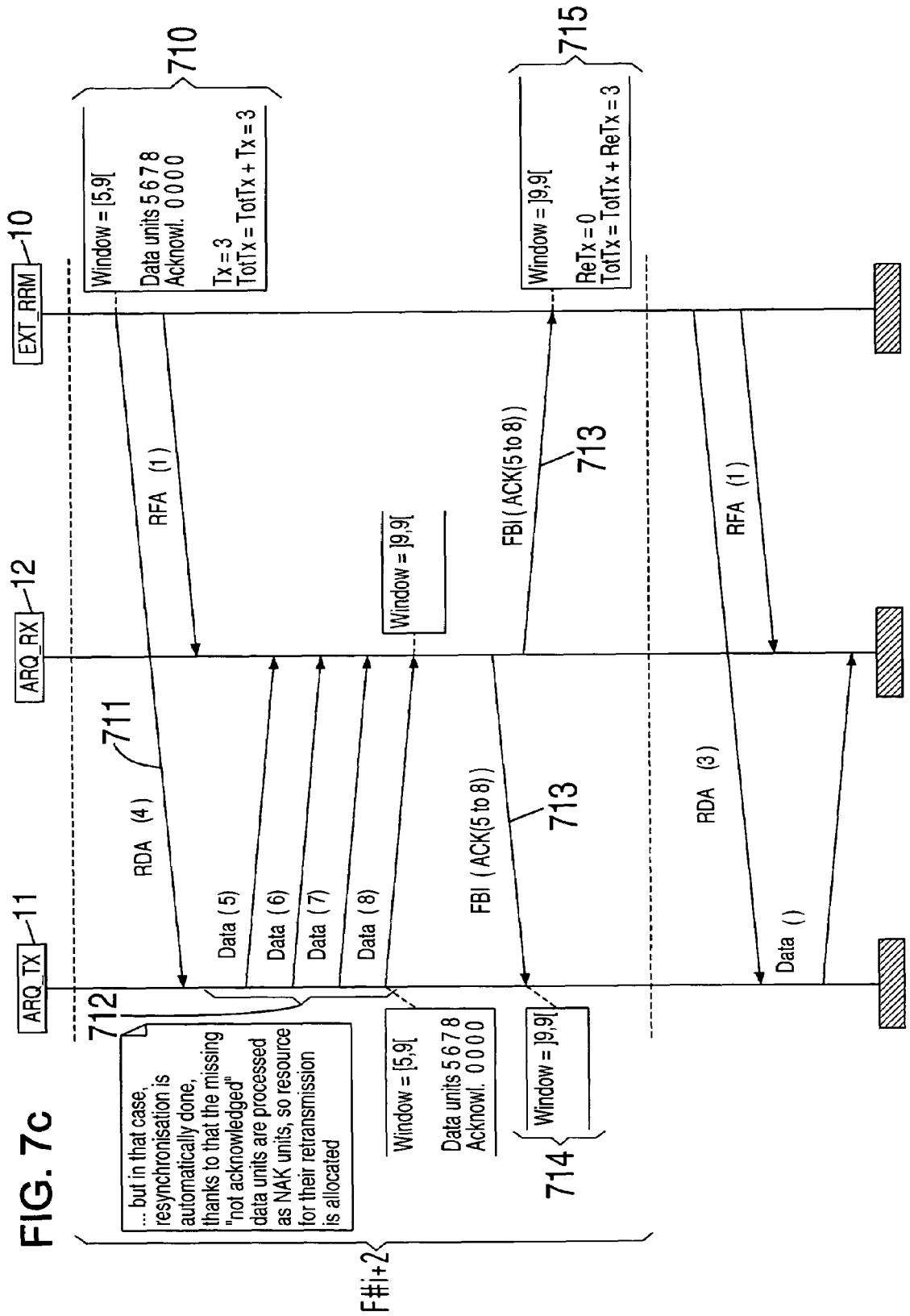

METHOD AND DEVICE OF RESOURCE ALLOCATION

BACKGROUND OF THE INVENTION

1. Technical Field

The present invention relates generally to communication networks, and more particularly to resource allocation in a network based on an ARQ protocol.

2. Related Art

Networks prone to relatively high error levels, such as wireless or power line networks, integrate generally an Error Control (EC) unit in the Data Link Layer (LL) in order to retransmit data that have encountered errors. In such systems, a Medium Access Control (MAC) layer is in charge of sharing the resource provided by the PHYsical (PHY) layer between the different users.

Several schemes, which are well known by a person skilled in the art, are based on a centralised Time Division Multiple Access (TDMA) scheme using MAC protocol and MAC Time Frame (MTF). The following sections describe basic principles of this type of scheme.

In such a scheme, STAtions (STAs) that are able to communicate between themselves are grouped together in a cell. A specific entity called Radio Resource Manager (RRM) unit is responsible for distributing the resource provided by the PHY layer among the STAs within the cell. In a TDMA scheme, time is divided in series of MTF, each comprising several reserved time intervals called "dedicated time slot". The PHY resource allocated to an STA comprises one or more dedicated time slots, in which the STA can transmit data over the transmission medium. Dedicated time slots may have a variable duration and are dynamically granted on a per MTF basis according to the requirements of the STAs. At MAC level, an STA can emit in a dedicated time slot a data traffic received from an upper layer of its protocol stack. In addition, an STA can also transmit signaling messages, generated by different modules comprised in the LL, as for example MAC or EC unit, to a destination STA or to the RRM unit. STAs indicate their resource requirements to the RRM unit through specific MAC signaling messages called Resource Request (RR) messages. According to those requirements, the RRM unit distributes the PHY resource contained within each MTF.

In order to provide an error-free service to the upper layer, an EC unit based on an Automatic Repeat reQuest (ARQ) protocol can be performed to ensure reliable Protocol Data Unit (PDU) transmission. Classically, ARQ protocols rely on an identification of the PDUs that is common to the STA transmitting PDUs and the STA receiving these PDUs, respectively noted a transmitter and a receiver. This identification is used by such a protocol so that the receiver can indicate to the transmitter which PDUs are not correctly received through so called FeedBack Information (FBI) messages. Consequently, upon reception of these FBI messages, the transmitter is able to perform PDUs retransmission. The PDU identification is typically a Sequence Number (SN) specific to each PDU. In general, this SN is handled by a considered layer only.

In order to avoid blocking transmission by waiting for the FBI message each time a PDU is emitted, a sliding window mechanism is generally implemented. In such a sliding window mechanism, the transmitter manages a list of SNs that it is allowed to send, and the receiver manages a list of SNs that it is prepared to receive. Each of these lists is thought of as a window of PDUs. In the transmitter, only the PDUs within such a window can be emitted.

FIG. 1 illustrates a classical ARQ scheme according to the prior art. The system comprises the RRM unit 10. A transmitter ARQ unit 11 and a receiver ARQ unit 12 are respectively associated to a transmitter and a receiver. For the sake of simplification, a single data flow 15 is considered. The direction used to transmit PDUs is called "Forward direction", while the reverse direction used to return feedback information about the transmitted PDUs is called "Backward direction".

The transmitter ARQ unit 11 sends an RR message 13 to request resource to the RRM unit 10 for initial PDUs transmission. The transmitter ARQ unit 11 transmits PDUs 15 to the receiver ARQ unit 12 through the resource allocated by the RRM unit 10 to it. On the other hand, the receiver ARQ unit sends a RR message 16 to the RRM unit 10 to request resource for FBI messages transmission. Upon reception of the transmitted PDUs, the receiver ARQ unit sends an FBI message 14 through the resource allocated by the RRM unit to it.

In error-prone systems, such as wireless or power line networks, as already described above, an EC unit is introduced in the MAC layer and an ARQ scheme is often implemented. As result of the above comments to FIG. 1, such an ARQ scheme induces a signaling overhead. Actually, both the transmitter ARQ unit and the receiver ARQ unit use RR messages to request resource from the RRM unit, in order to send PDUs or FBI messages respectively. As a result of this additional signaling overhead, latency and extra bandwidth consumption are introduced.

It has been proposed to limit resource usage and transfer latency by implementing a Selective ARQ (SARQ) scheme. According to such a scheme, the incorrectly received PDUs are individually advertised by the receiver and retransmitted by the transmitter. Such SARQ scheme minimizes the PDU retransmission because only not correctly received PDUs are retransmitted, instead of all PDUs comprised in the transmitter ARQ sliding window.

However, minimizing the bandwidth required for PDUs retransmission may not reduce the amount of resource used for signaling messages in order to perform such a SARQ protocol. Moreover, the transfer delay can even be higher.

It results from the foregoing that it is difficult to apply an efficient resource allocation in a network based on an ARQ protocol.

SUMMARY OF THE INVENTION

The present invention thus proposes a resource allocation scheme based on a centralised TDMA scheme, while limiting the transfer delay over the transmission link for the whole exchanged data. In such a scheme, time is divided in a series of Time Frames (TFs).

In a first aspect, the invention proposes a method of resource allocation in a network comprising:

at least one transmitter, associated to a transmitter ARQ unit, for transmitting PDUs according to an ARQ protocol;

at least one receiver, associated to a receiver ARQ unit, for receiving the transmitted PDUs and for acknowledging each of the PDUs by sending back, to the transmitter, one or more FeedBack Information (FBI) messages, comprising feedback acknowledgement status information advertising about correct or incorrect reception of the transmitted PDUs;

a Radio Resource Management (RRM) unit for allocating resource to the transmitter and/or receiver based on a TDMA scheme providing a series of Time Frames (TFs).

The method comprises the steps of:

the transmitter ARQ unit transmitting PDUs to the receiver and managing a transmitter ARQ sliding window, having a bottom corresponding to the oldest transmitted PDU not yet acknowledged and an end corresponding to the next PDU to be transmitted;

the receiver ARQ unit managing, upon reception of the PDUs, a receiver ARQ sliding window, having a bottom corresponding to the oldest PDU not yet correctly received and an end corresponding to the last correctly received PDU;

the receiver ARQ unit sending back, after reception of the PDUs, FBI message or messages to the transmitter; and the transmitter ARQ unit, upon reception of the FBI message, updating the transmitter ARQ sliding window according to feedback acknowledgement status information received therein, and retransmitting PDUs interpreted as not correctly received by the receiver based on the transmitter ARQ sliding window thus updated;

wherein the RRM unit also receives the FBI messages and manages an extended ARQ sliding window having a bottom and an end which are updated according to feedback acknowledgement status information received therein; and wherein the RRM unit allocates an amount of forward resource to the transmitter for initial PDUs transmission and/or for PDUs retransmission and an amount of feedback resource to the receiver for sending back FBI messages, the amount of forward resource and the amount of feedback resource being computed based on the extended ARQ sliding window.

Advantageously, the RRM unit may manage the extended ARQ sliding window on a per TF basis. An amount of resource, corresponding to a number n of PDUs, is requested for the transmitter for initial PDUs transmission. Then, the end of window of the extended ARQ sliding window is updated according to the number n and the bottom of window of the extended ARQ sliding window is updated upon reception of one or more FBI messages.

The RRM unit allocates resource based on a TDMA scheme providing TFs. The present invention encompasses any structure of TFs. In a current TF, feedback resource may be allocated for transmission of feedback acknowledgement status information about PDUs sent through forward resource of the same current TF, or feedback resource may be allocated for transmission of feedback acknowledgement status information about PDUs sent through forward resource of a preceding TF. In one embodiment of the present invention, the extended ARQ sliding window is updated according to the type of TF structure. Thus, the RRM unit computes and allocates the amount of feedback resource in the current TF before updating the end of the extended ARQ sliding window when feedback resource corresponds to a forward resource of a TF preceding the current TF. The RRM unit computes and allocates the amount of feedback resource after updating the end of the extended ARQ sliding window when feedback resource corresponds to forward resource of the current TF.

Preferably, the transmitter associates with each PDU in the transmitter ARQ sliding window a feedback acknowledgment status flag according to the ARQ protocol. Thus, the transmitter may retransmit only the PDUs associated with feedback acknowledgement status flag indicating a not correct reception. Thus, in one embodiment of the present invention, a transmitter ARQ sliding window comprises a reference of each PDU pending in association with a feedback acknowledgment status flag according to the ARQ protocol. Stated otherwise, for each pending PDU, such feedback acknowledgement status flag is deduced from the ARQ protocol and notably from the feedback acknowledgement status information comprised in the FBI messages.

Advantageously, the RRM unit may further store in the extended ARQ sliding window feedback acknowledgement status flag from the received FBI messages. Consequently, the RRM unit may compute and allocate an amount of forward resource to the transmitter, according to the feedback acknowledgement status flag stored in the extended ARQ sliding window, and an amount of feedback resource to the receiver so that the extended ARQ window could be acknowledged.

In one embodiment of the present invention, the RRM unit sends one or more Enforced FeedBack Information (EFBI) messages to the transmitter upon reception of one or more FBI messages. The EFBI messages can be built from the last received FBI message or messages or can be built from the extended ARQ sliding window, according to a determined criterion.

In one embodiment of the present invention, the transmitter sends a Resource Request for Retransmission (RRR) message to the RRM unit comprising an amount of resource required for PDUs retransmission. Then, the RRM unit updates the extended ARQ sliding window based on the amount of resource for retransmission received through the RRR message. Finally, the RRM unit can compute the amount of resource to be allocated based on the extended ARQ sliding window thus updated.

Advantageously, the transmitter can send a Resource Request for Retransmission (RRR) message to the RRM unit comprising an amount of resource required for PDUs retransmission. In this case, the RRM unit can compare the amount of resource requested in the received RRR message with the amount of resource for PDUs retransmission computed from the current extended ARQ sliding window. Thus, upon the comparison, the RRM unit can send one or more EFBI messages to the transmitter when the amount of resource requested and the amount of resource computed are different. Consequently, the RRM unit allocates an amount of resource selected among the amount of resource requested and the amount of resource computed, according to a characteristic of the ARQ protocol.

The present invention encompasses any type of ARQ protocol. The feedback acknowledgement status flag is handled according to the ARQ protocol. Thus, when the ARQ protocol is an Extended Selective ARQ (ESARQ) protocol, the feedback acknowledgement status flag associated to a PDU of the extended ARQ sliding window is preferably set to "not acknowledged" upon transmission of the PDU or upon reception of a negative acknowledgement for the PDU via an FBI message. This feedback acknowledgement status flag is preferably set to "acknowledged" upon reception of a positive acknowledgement for the PDU via an FBI message. On the other hand, when the ARQ protocol is a Selective ARQ (SARQ) protocol, the feedback acknowledgement status flag associated to a PDU of the extended ARQ sliding window is set to "acknowledged" upon reception of a positive acknowledgement via FBI message, it is set to "negatively acknowledged" upon reception of a negative acknowledgement and it is set to "not acknowledged" upon initial transmission or retransmission of the PDU.

In a second aspect, the invention proposes a device for resource allocation in a network comprising means for carrying out the method according to the first aspect.

Thus, the RRM unit according to an embodiment of the invention is able to compute and allocate transmission resource to the transmitter and to the receiver without receiving a signalling message neither from the transmitter nor from the receiver for requesting resource. Consequently, an embodiment of the invention enhances efficiency of resource allocation scheme.

BRIEF DESCRIPTION OF THE DRAWINGS

Further features and advantages of the present invention will become more apparent from the description below. The latter is given purely by way of illustration and should be read in conjunction with the appended drawings, of which.

DESCRIPTION OF PREFERRED EMBODIMENTS

Figure 1:
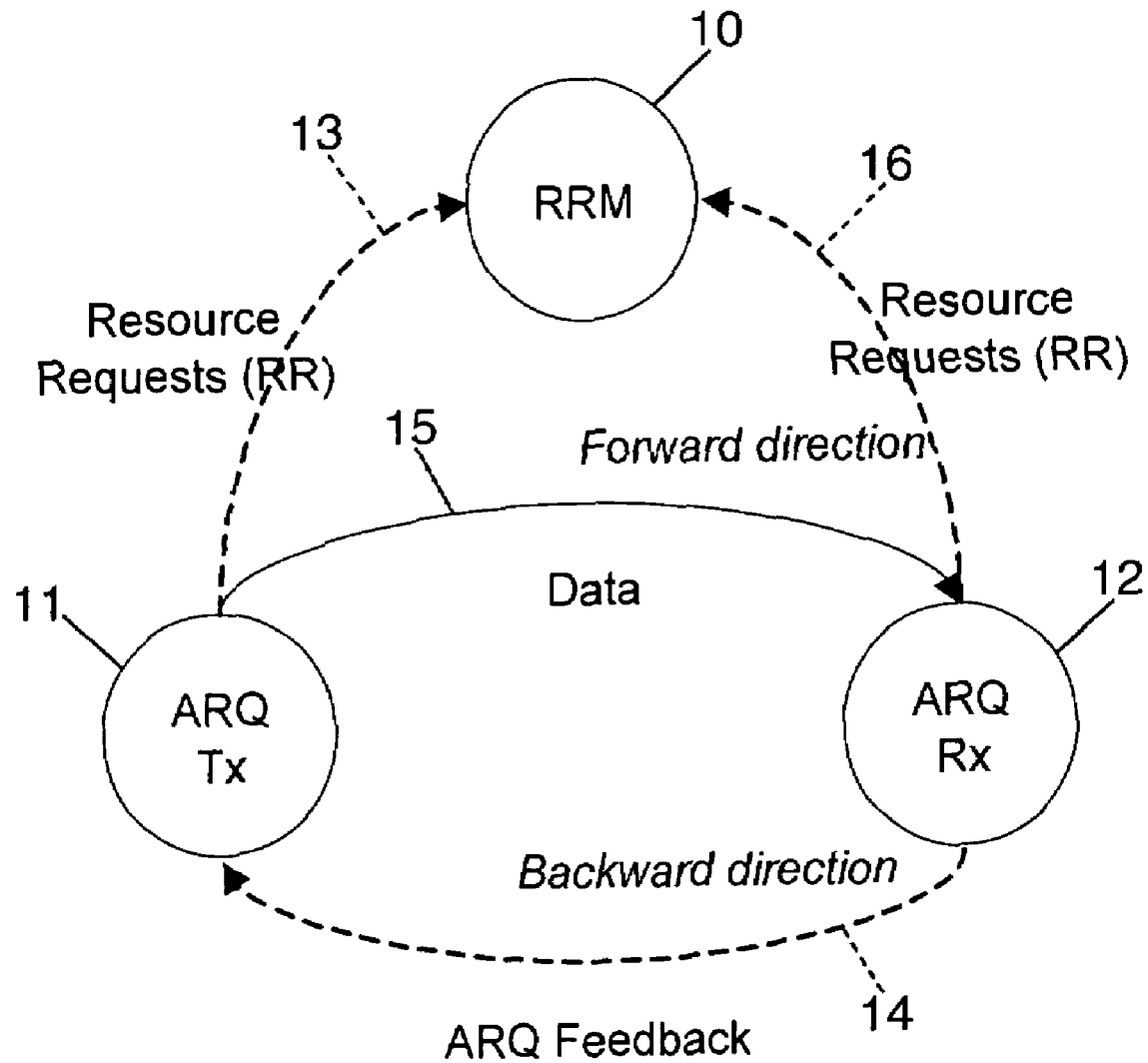
FIG. 1 illustrates a classical ARQ scheme according to the prior art; it has already been commented.

As it has already been noted, the signalling overhead generated for requesting and allocating resource to the transmitter and the receiver often induces transfer latency. Based on this analyse, one embodiment of the present invention proposes a method of resource allocation efficiently adapted for reducing transfer latency in a network based on a centralised resource allocation scheme in an error prone network using an ARQ protocol.

As described in the introduction with reference to a classical ARQ protocol, the PDUs are identified in the same way by both transmitter and receiver. In one embodiment, such an identifier is a SN. Moreover, a feedback acknowledgement status information is preferably associated to each transmitted PDU in an FBI message.

The RRM unit allocates resource to the transmitter and the receiver based on needs of the transmitter for initial PDUs transmission, and for PDUs retransmission. Making the RRM unit able to compute an amount of resource required for PDUs retransmission may allow the system to avoid generating signalling overhead between the transmitter and the RRM unit. Accordingly, in one embodiment of the invention, the RRM unit handles some information to be able to compute the amount of resource required for PDUs retransmission. Preferably, the RRM unit manages an extended ARQ sliding window.

This extended ARQ sliding window can be seen as an image of both the transmitter and the receiver ARQ sliding window. Such a system is coherent thanks to the fact that, first, the image of the bottom of the receiver ARQ sliding window in the extended ARQ sliding window, i.e. the bottom of the extended ARQ sliding window, is preferably below or equal to the bottom of the receiver ARQ sliding window. Second, the image of the end of the extended ARQ sliding window, is always beyond or equal to the end of the transmitter ARQ sliding window. This way, the RRM unit is able to compute an amount of resource allowing PDUs retransmission without receiving a signaling message from the transmitter for requesting resource.

In one embodiment of the present invention, the receiver sends to the transmitter the FBI messages, as in a classical network based on an ARQ protocol. However, the RRM unit also receives the FBI messages which make it able to update the bottom of the extended ARQ sliding window. Hence, the RRM unit preferably updates the extended ARQ window upon reception of FBI messages. In one embodiment, these FBI messages comprise, associated to each transmitted PDU, feedback acknowledgement status information advertising about correct or incorrect reception by the receiver. The bottom of the window is set based on information comprised in the FBI message. As a result, the bottom of the extended ARQ sliding window is synchronized with the bottom of the receiver ARQ sliding window.

On the other hand, the RRM unit updates the extended ARQ sliding window accordingly to the resource required for the transmitter to allow next initial PDUs transmission. The RRM unit computes the amount of resource for initial PDUs transmission upon different triggers, depending on the type of allocation system. In some types of allocation system, the resource for initial PDUs transmission can be automatically allocated by the RRM unit. In this case, the RRM unit allocates the same amount of resource for initial transmission in each TF. In other types of allocation system, the transmitter sends to the RRM unit a signaling message to require a given amount of resource for initial PDUs transmission. Then, the RRM unit computes the amount of resource for the initial PDUs transmission based on the received amount in this signaling message. The present invention encompasses other ways to make the RRM unit able to computes an amount of resource for initial PDUs transmission. For example, the amount of resource for the initial PDUs transmission can be computed based on determined rules. These rules can be function of network characteristics or stochastic rules. According to the amount of resource computed by the RRM unit for initial PDUs transmission, the RRM unit updates the end of window of the extended ARQ sliding window. In one embodiment of the invention, the RRM unit performs this update sensibly at the same time as it performs the resource allocation.

Preferably, the extended ARQ sliding window comprises an identifier of each PDU to be transmitted for a first time or to be retransmitted. Such an identifier can be the SN, for instance.

As a result, the RRM unit advantageously computes an amount of forward resource for initial transmission and for retransmission, based on information comprised in the extended ARQ sliding window. Then, the RRM unit allocates the computed amount of resource to the transmitter, preferably by sending a resource allocation message to the transmitter.

By this way, without any delay, the RRM unit can easily allocates enough resource to the transmitter to allow the transmission of the PDUs pending for initial transmission or for retransmission.

Preferably, each time the RRM unit computes an amount of resource to be allocated to the transmitter, it further computes an amount of resource to be allocated simultaneously to the receiver, based on this amount of resource computed for the transmitter. The amount of resource, like this computed, is allocated to the receiver simultaneously, i.e. in the same TF, for feedback information delivery. As a result, the whole transmitter ARQ window could be advantageously acknowledged in the same TF or in the following one, according to the frame building. This point allows reducing transfer delay.

The preceding sections describe an embodiment with basic principles of the present invention, particularly well adapted when no FBI messages are lost. However, as discussed in the introduction, the wireless link is prone to error. Consequently, though FBI messages may be coded in a more robust way than PDUs, they can also be damaged during their transmission.

A first consequence of an FBI message loss is that the state of the receiver ARQ sliding window can not be known immediately, on the RRM unit side and on the transmitter side. In this case, the way to keep on with the latency minimization is to consider that, if no feedback information has been reported for a given PDU, it will be considered as lost, preferably. If in reality it was not, there is no induced delay; if it was, delay is just the same as if corresponding feedback information would have been received. The counterpart of this approach is that a PDU can be repeated unnecessarily and a strict SARQ scheme is no more applied. Then, in the following description, two contexts are distinguished: latency minimization under the strict SARQ scheme and latency minimization under an Extended SARQ scheme (ESARQ).

In SARQ scheme, it is noted that a PDU which is "interpreted" as not correctly received corresponds to a PDU with a feedback acknowledgement status information which is negative.

In ESARQ scheme, a PDU which is "interpreted" as not correctly received is a PDU that is not explicitly acknowledged. ESARQ scheme considers as negatively acknowledged a PDU that is not explicitly acknowledged.

Regarding SARQ and ESARQ schemes, an useful feedback information can be defined as a set of acknowledgements (positive or negative) carried by the FBI messages, that leads the transmitter ARQ unit or the RRM unit to update the feedback acknowledgement status flag corresponding to the PDUs referenced in the transmitter ARQ sliding window and in the extended ARQ sliding window respectively. The transmitter is then able to trigger PDUs retransmission, when it is required. Depending on the ARQ scheme, the more useful feedback information differs. In SARQ scheme, explicit Negative AcKnowledgements (NAK) are the most useful feedback information since basically no retransmission is done in the absence of NAK, to avoid to waste resource. In ESARQ scheme, on the contrary, the explicit positive ACKnowledgements (ACK) are the most relevant information, since at the RRM unit level they allow reducing the amount of resource allocated for retransmission. Moreover, in the transmitter, the ACKs avoid the risk of badly retransmit some correctly received PDUs.

A second consequence of an FBI message loss is that a de-synchronization of the transmitter ARQ sliding window and the extended ARQ sliding window can occur. Actually, the errors are frequently time and location dependent, thus, FBI messages that are received and decoded by the RRM unit may not be decoded by the transmitter ARQ unit. Inversely, FBI messages that are received and decoded by the transmitter ARQ unit may not be decoded by the RRM unit. It could result a de-synchronization between ARQ sliding windows. Then, the allocation of resource by the RRM unit and/or the use of the resource by the transmitter ARQ unit may not match the real requirements for the proper spreading of the data flow. Moreover, this case can badly impact the transfer latency.

Therefore, one embodiment of the present invention also provides ways to detect the occurrence of such de-synchronization and to resynchronize as soon as possible the transmitter and the extended ARQ sliding windows. In the following, three ways are considered, which rely on additional signaling messages to enable the resynchronization process. They are respectively designated as a first variant, second variant, and third variant. Third variant provides the best performances in terms of delay reduction and/or resource minimization. However, third variant generates a bit more signaling messages. Apart from these three different options, a last solution is proposed that may be used in place or in complement of the others. This last variant is particularly advantageous when no regular resources are granted for the transmitter. That may occur, for instance, when an automatic and static resource allocation is performed by the RRM unit for a data flow. This is called fourth variant.

The main parameters used in the first, second, third and fourth variants are described in the following.

The transmitter and receiver ARQ sliding windows map the outstanding PDUs, which have been acknowledged or not by FBI messages. In the following, Bow and Eow delimit respectively the bottom and the end of the window in progress, i.e. the set of PDUs in transit waiting for reception and acknowledgement delivery. At transmitter side, Bow, noted Tx_Bow, represents the lowest SN of PDUs not yet positively acknowledged by the receiver ARQ unit, while Eow, noted Tx_Eow, designates the next highest SN of PDUs that can be emitted. On the receiver side, Bow, noted Rx_Bow represents the lowest SN of PDUs not yet or badly received, while Eow, noted Rx_Eow, represents the last correctly received PDU with the highest SN.

The invention encompasses other identifiers than the SN to identify a PDU on both transmitter and receiver sides.

The extended ARQ sliding window defined at the RRM unit level, integrates the relevant SN of PDUs listed in the receiver and transmitter ARQ sliding windows advantageously. In one embodiment, the extended ARQ sliding window represents a map of the pending PDUs that have already been transmitted and the PDUs that are expected to be transmitted next. The extended ARQ sliding window is delimited by its bottom of window corresponding to the bottom of the receiver ARQ sliding window, noted Ext_Bow and its end of window corresponding to the end of the transmitter ARQ sliding window, noted Ext_Eow.

In addition, in one embodiment of the present invention, a feedback acknowledgement status flag is associated to each PDU listed in the transmitter, the receiver and the extended ARQ sliding windows. In SARQ scheme, such feedback acknowledgement status flag can take following values "acknowledged", "negatively acknowledged" or "not acknowledged". In ESARQ scheme, such feedback acknowledgement status flag can take either a value corresponding to "acknowledged" or a value corresponding to "not acknowledged".

An amount of forward resource to be allocated to the transmitter and an amount of feedback resource to be allocated to the receiver, for related FBI messages, are computed by the RRM unit based on this extended ARQ sliding window. The amount of forward resource is advantageously computed and allocated at each TF, according to the feedback acknowledgement status flag of the PDUs contained in the extended ARQ sliding window. While, the amount of feedback resource is scheduled so that the whole extended ARQ sliding window could be acknowledged in one TF.

Note that the exact amount of resource required to implement this scheme is not quantified here since its optimization may depend on the way the FBI messages are built and coded (explicit/implicit, cumulative or not, positive/negative acknowledgements, etc. . . . ).

The number of PDUs that are waiting for first transmission at the transmitter level, at TF#i, is noted Txi. For the sake of better understanding, a constant bit rate flow is considered and this number Txi is computed according to this bit rate flow. For variable bit rate flow applications, like MPEG4 for example, the number Txi is determined based on the number of pending PDUs for initial transmission and for PDUs retransmission.

For the following, a resource unit is introduced to quantify a given amount of resource.

The number of resource units evaluated for PDUs retransmission after feedback information analysis at TF#i is noted ReTxi.

A positive or negative amount of resource units to add to Txi, and ReTxi, before final allocation decision is noted Compensation. Compensation parameter is an optional parameter used in the different variants of one embodiment of the invention, as it will be described below. This optional parameter aims to correct, when it is possible, the number of resource units already computed but not yet allocated, if some de-synchronization has been detected by the RRM unit before performing the resource allocation. Depending on the variant, such a correction impacts initial transmission or retransmission. Different ways to compute such a parameter will be detailed in the following.

For the sake of simplification, the sum of the three parameters Txi, ReTxi, and optionally Compensation, at TF#i, is noted TotTxi. Thus, TotTxi represents the total number of resource units to be allocated, for PDUs transmission, at TF#i, i.e. the amount of forward resource to be allocated to the transmitter.

The following sections describe relevant entities and messages on which one embodiment of the invention is carried out.

Firstly, the RRM unit, the transmitter ARQ unit and the receiver ARQ unit are considered as three distinct units, to let the most generic configuration be used. Thus, direct communications between the STAs are allowed. The invention encompasses a configuration in which the transmitter ARQ unit, respectively the receiver ARQ unit, is co-located with the RRM unit. In this case, the described mechanism is even improved since the synchronization between the transmitter ARQ sliding window, respectively the receiver ARQ sliding window, and the extended ARQ sliding window is guaranteed. Thus, the risks of de-synchronization are limited, and then the risks of over resource allocation, for instance, are reduced. Moreover, in a configuration of co-localization, some message exchanges can be no more required or be internally performed, which still reduces the amount of resource units needed to ensure reliable and fast transmission.

One embodiment of the present invention relies on signaling messages detailed in the following sections.

Resource Data Allocation (RDA) messages are used by the RRM unit to inform the transmitter about the amount of resource which is allocated to it. Preferably, this message identifies the corresponding dedicated time slots in a given TF. Such a message can be a MAC signalling message sent at the beginning of the given TF for instance.

Resource Feedback Allocation (RFA) messages are used by the RRM unit to inform the receiver about the amount of resource which is allocated to it. Preferably, this message identifies the corresponding dedicated time slots in a given TF. Such a message can be a MAC signaling message and it can be sent at the beginning of the given TF for instance.

FeedBack Information (FBI) messages inform the transmitter about the correct reception or not of the transmitted PDUs by the receiver. Such messages are sent in backward direction by the receiver. In addition, when the RRM unit is not co-located with the transmitter, these messages are preferably also accessible to the RRM unit to make the RRM unit able to update, and to synchronize with the transmitter, the extended ARQ sliding window.

In this context, optionally, the RRM unit can send to the transmitter some FBI messages. Either these FBI messages are built upon the extended ARQ sliding window or they are built directly from the FBI messages sent by the receiver, and thus they are similar to the last received FBI message. The RRM unit determines such a way to build an FBI message according to one or more determined criterion. This optional operation is called enforced resynchronization in the following. To allow distinction, FBI messages sent from the RRM unit to the transmitter are called Enforced Feedback Information (EFBI) messages. The enforced resynchronization allows sending FBI messages twice within one TF duration. However, the enforced resynchronization should benefit of space diversity as it is built on a relay channel, i.e. from the receiver ARQ unit to the RRM unit, and then from the RRM unit to transmitter ARQ unit. In this context, space diversity enhances the probability that all FBI messages will be finally received by the transmitter. Moreover, it is worth noting that a channel from the RRM unit to the transmitter ARQ unit is the same channel used to transmit the RDA message from the RRM unit to the transmitter ARQ unit. Then, when the TDMA system works well, the enforced resynchronization has great chances to well operate too.

Resource Request Data (RRD) messages are used by the transmitter to request some resource to the RRM unit to send new PDUs. Such messages carry the value of the parameter Txi. For predictable flows (constant bit rate flows, isochronous flows, etc. . . . ) such a request message can be self-generated by the RRM unit after set-up of the flow by the MAC protocol or upon other determined rules. Otherwise, the RRD messages are carried over the medium, except if the RRM unit is co-located with the transmitter. In this latter case, the RRD messages may correspond to the service access point primitive of the transmitter advertising the MAC for pending PDUs, or to specific internal messages.

When the RRM unit is not co-located neither with the transmitter ARQ unit nor with the receiver ARQ unit, the RRM unit has not a priori knowledge of PDUs reception at the receiver level and of the FBI messages reception at the transmitter level. Then the synchronization of the extended ARQ sliding window with the transmitter and the receiver ARQ sliding windows may fail sometimes.

In order to maintain a minimum transfer latency, in one embodiment of the invention, the basic scheme is enriched so that the extended ARQ sliding window always contains an image of the transmitter and the receiver ARQ sliding windows. It results therefrom that the duration of de-synchronization between the transmitter ARQ sliding window and the extended ARQ sliding windows is substantially reduced. In the following, some optional messages are defined, that can be used alone or in combination as described in the variants to improve the performances.

Resource Request for Retransmission (RRR) messages are sent by the transmitter to request resource to the RRM unit for PDUs retransmission. The amount of resource requested in this message corresponds to the parameter ReTxi. The RRR messages are carried over the medium, except if the RRM unit is co-located with the transmitter ARQ unit. In this latter case, the RRR messages may correspond to the service access point primitive of the transmitter advertising the MAC for pending PDUs, or to specific internal messages. When carried over the medium, a RRR message can be merged with a RRD message. The optional compensation parameter can be used in addition to increase or decrease the value of the parameter ReTxi, estimated by the RRM unit according the extended ARQ sliding window, when the amount of resource units requested by the transmitter for PDUs retransmission differs from the value of the parameter ReTxi. These optional messages are used in first variant and third variant described below.

Enforced Feedback Information (EFBI) messages consist, preferably, in a replication of the FBI messages received at the RRM unit level. These messages can also be built upon the extended ARQ sliding window. They are sent optionally by the RRM unit to the transmitter when the RRM unit detects that some useful feedback information is missing at the transmitter level. When these messages are used, they should help the transmitter refreshing the transmitter ARQ sliding window with more up-to-date acknowledgements before transmitting new PDUs in the next allocated resource units.

In ESARQ scheme, these messages limit the risk of useless retransmission of PDUs which have already been correctly received. In SARQ scheme, these messages allow the RRM unit to increase the resource granted for retransmission of PDUs for which the feedback acknowledgement flag information is equal to "not acknowledged", when related FBI messages have been lost at the transmitter level. Corresponding resource would not be allocated otherwise, since they would remain unused. These messages are used in second and third variants.

End of Window Indication (EWI) messages are sent by the transmitter to the RRM unit to inform it about the current PDU at the end of the transmitter ARQ sliding window. Thus, the EWI message comprises preferably a PDU identifier, such as the SN value of the PDU, at the end of the transmitter ARQ sliding window (Tx_Eow). This message can be advantageously delivered to the RRM unit at least after each progression of the transmitter ARQ sliding window, i.e. after each PDU initial transmission for synchronizing the end of window of the transmitter ARQ sliding window and the extended ARQ sliding window. The EWI messages are further used by the RRM unit to evaluate if more resource units, than the resource units automatically computed, should be allocated to the transmitter. Thus, this message allows avoiding a possible mismatch in the number of resource units previously scheduled for first transmission. Such mismatch may occur when the transmitter ARQ unit or the RRM unit has failed in decoding an FBI message that has been perfectly decoded by the other addressee. In that case, the compensation parameter is computed to allocate more resource units than the resource units automatically computed for initial transmission.

In one embodiment of the present invention, when the RRM unit detects a de-synchronization upon reception of an EWI message, it updates the extended ARQ sliding window accordingly before computing the next amount of forward resource to be allocated from the extended ARQ sliding window thus updated.

It is assumed that dedicated resources are made available by the RRM unit to allow the transmitter to send RDA, RFA, RRD, RRR or EWI messages when it is required.

What follows prevents the RRM unit to allocate less resource than what would be required to obtain a transfer latency which is relatively low if the extended and the transmitter ARQ sliding windows are de-synchronised. In that case, it is possible that the extended ARQ sliding window does not encompass the entire transmitter and receiver ARQ sliding windows.

The end of the extended ARQ sliding window is advanced in the same way as the end of the transmitter ARQ sliding window, so for as the end of the extended ARQ sliding window is progressing upon computation of an amount of forward resource performed by the RRM unit and the end of the transmitter ARQ sliding window is progressing upon reception of RDA messages that contain the result of the RRM computation.

On the other hand, upon reception and analysis of FBI messages the RRM unit updates the extended ARQ sliding window. Then, de-synchronization may occur when an FBI message is successfully decoded at the RRM unit level but not at the transmitter level or when it is successfully decoded at the transmitter level but not at the RRM unit level.

Considering the SARQ scheme, in the case when an FBI message is successfully decoded at the RRM unit level but not at the transmitter level, some PDUs are marked as "negatively acknowledged" in the extended ARQ sliding window, i.e. their feedback acknowledgement status flag is preferably set to "negatively acknowledged", whereas they are still pending and are marked as "not acknowledged" on the transmitter side, i.e. their feedback acknowledgement status flag is preferably set to "not acknowledged" in the transmitter ARQ sliding window. The consequence is that the RRM unit will allocate more resource to perform retransmission of the PDUs marked as "negatively acknowledged". In fact, a part of allocated resource to the transmitter will be unused if the transmitter relies on an explicit negative acknowledgement criterion to trigger PDUs retransmission. However in this case, the minimum latency is maintained although some resources may be wasted.

Considering the SARQ scheme, in the case when an FBI message is successfully decoded at the transmitter level but not at the RRM unit level, the RRM unit will allocate less resource than what would be required to perform initial PDUs transmissions and PDUs retransmission.

The following variants propose an advantageous way to address these issues.

One embodiment of the invention, called first variant, relies on RRR messages used in complement to basic RRD messages. The main advantage of the RRR messages is that they allow the RRM unit to detect that more useful feedback information has been received at one side than another side. The RRM unit can then take the decision to grant more resource units than foreseen to limit the risk of extra transfer latency. On the contrary, the RRM unit can allocate only the requested resource units to optimize the use of bandwidth.

However, in ESARQ scheme, more resource units than needed can be granted sometimes. Actually, this condition can occur for instance when, after reception of the FBI and the RRR messages, more useful feedback information has been a priori received at the RRM unit level. So the number of resource units requested for retransmission by the transmitter is greater than the one evaluated by the RRM unit. In that case, the RRM unit will advantageously allocate the requested resource units to keep on with minimum transfer latency. By this way, no transfer latency is introduced by lack of resource allocated to the transmitter. Thus, pending PDUs waiting for retransmission can be sent. But in this case, some resource units are wasted. Another one embodiment of the invention, called third variant, described below away faces with such issues.

In another embodiment, called second variant, EFBI messages are systematically sent by the RRM unit to the transmitter upon FBI messages reception. Although these messages are redundant as long as the transmitter and the extended ARQ sliding windows are synchronized, they allow to limit the risks of waste of resource units and/or extra transfer latency when more feedback information has been received at the RRM unit level than at the transmitter level. Indeed otherwise, when useful feedback information is missing at the transmitter side, some granted resource units could either remain unused, as it is in SARQ scheme, or be used badly to retransmit some PDUs already correctly received in ESARQ scheme, expensing resource units allocated for initial transmission maybe. Thus in both cases, extra transfer latency can be reduced sometimes compared to the basic mechanism based on RRD and FBI signaling messages only, already described above.

Another embodiment, called third variant, relies on a joint use of the EFBI messages and the RRR messages. Actually, in this case, the EFBI messages are sent by the RRM unit to the transmitter after FBI messages reception when the RRM unit detects that more useful feedback information have been lost at the RRM unit level than at the transmitter. The detection is done by comparison of the resource units requested by the transmitter for retransmission through the RRD messages, with the ones determined by the RRM unit according to the extended ARQ sliding window.

This option offers the following advantages. At first, in ESARQ scheme, after reception of the FBI and the RRR messages, if the number of resource units computed for PDUs retransmission by the transmitter is greater than the one computed by the RRM unit level according to the extended ARQ sliding window, then the RRM unit can allocate less resource than requested and send to the transmitter the EFBI messages. So in that case, only the resource initially scheduled is allocated which limits the waste of resource. Otherwise, in the assumption that more feedback information has been received at the transmitter level than at the RRM unit level, the RRM unit does not send any EFBI message. Stated otherwise, in one embodiment of the present invention corresponding to the third variant, the RRM unit allocates the lowest amount of resource among the amount of resource requested by the transmitter and the amount of resource computed from the extended ARQ sliding window.

In SARQ scheme, the resource allocation is no more restricted to the requested resource when lower than the one computed by the RRM unit initially, since the chances are high now that some PDUs not correctly received can be successfully retransmitted soon if corresponding resources are granted. In first variant, granting more resources than requested would lead to waste some resource, since they would probably remain unused. In one embodiment of the present invention corresponding to the third variant, the RRM unit allocates the greatest amount of resource among the amount of resource requested by the transmitter and the amount of resource computed from the extended ARQ sliding window.

Another embodiment of the present invention, called fourth variant, relies on the EWI message reception that carries the current end of the transmitter ARQ sliding window. Upon reception and analysis of this message, the RRM unit determines a value of the compensation parameter for initial transmission.

The EWI message may help to reduce the transfer latency in case of de-synchronization that may affect the amount of resource scheduled for initial transmission. This system allows anticipating on next correct FBI messages reception. It becomes useless when the RRM unit is co-located with the transmitter.

In this embodiment, the basic idea is to place under control of the RRM unit the evolution of the sequencing of the PDUs carried out in the forward direction, as well as feedback information sent in the backward direction. Thus, the RRM unit can verify that both transmitter and extended ARQ sliding windows are still properly synchronized. Each time a set of new PDUs is sent to another STA in a given TF, the transmitter notifies the RRM unit, through a EWI message, the current SN stored as the end of the transmitter ARQ sliding window. This current SN is sent as the parameter Tx_Eow of the EWI message. It is assumed that the transmitter schedules PDUs retransmissions before initial PDUs transmissions. If the transmitter ARQ unit and the extended ARQ window are not synchronized anymore, more resource at the next transmission occurrence may be required. That case occurs when the SN of the last PDU sent for the first time by the transmitter is lower than expected. Then, the RRM unit compares this SN with the SN of its own end of window, i.e. the parameter Ext_Eow. In this case, extra resource is allocated by computing the Compensation parameter, which is evaluated upon FBI message reception and analysis, at TF#i. Such a parameter is computed as follows:

$$\text{Compensation} = Ext\_Eow - \text{Max}(Tx\_Eow; Ext\_Bow)$$

This computed value corresponds to the interval of consecutive SNs that may not be yet covered by current resource computed to be allocated. The distance is evaluated as the difference between the value of the parameter Ext_Eow, and the value that reaches the parameter Tx_Eow in the transmitter ARQ sliding window at the current TF. In addition, the upper bound integrates Ext_Bow in the computation to limit the extra amount of resource units, in case of an EWI message would be damaged leading Ext_Bow to be possibly higher than Tx_Eow.

The basic operations performed in one embodiment of the present invention are detailed in what follows.

When resource is computed, the RRM unit allocates the computed resource to the transmitter and the receiver preferably by sending RDA and RFA messages respectively to the transmitter and to the receiver.

At the transmitter level, the capacity needed to transmit the PDUs waiting for initial transmission, at TF#i, corresponding to the value of the parameter Txi, may be checked at each TF and an RRD message is delivered if the value of the parameter Txi is not null.

Upon reception of an RRD message, by default, the RRM unit memorizes the amount of resource requested, i.e. the parameter Txi. Then, the RRM unit should provide the corresponding resource possibly in the next TF or as soon as possible. The RRM unit preferably allocates an amount of resource, noted Tx, which is lower or equal to the amount of resource requested Txi. When some related dedicated time slots are allocated, the RRM unit updates the end of the extended ARQ sliding window by the corresponding amount of allocated resource, as represented in the following equation:

$$Ext\_Eow = Ext\_Eow + Tx.$$

The PDUs between the previous value of the end of window and the new one are marked as "not acknowledged".

Upon reception of PDUs, the receiver updates the receiver ARQ sliding window and builds the FBI messages that are sent if there is resource available.

Upon reception of the FBI messages, the transmitter updates the transmitter ARQ sliding window and selects the PDUs to be retransmitted.

Upon reception of the FBI messages, the RRM unit updates the extended ARQ sliding window and checks the number of data units that have to be retransmitted. Thus, for each positively acknowledged PDU, the associated feedback acknowledgement status flag is set to "acknowledged". For each negatively acknowledged PDU, the associated feedback acknowledgement status flag is set to "negatively acknowledged" in SARQ scheme, or remains to "not acknowledged" in ESARQ scheme. Then, in the same time or at last, the value of the parameter ReTxi, is incremented with the number of PDUs that are considered as negatively acknowledged. This depends on their status information of acknowledgement that can be explicit or not according to the choice of ARQ scheme, SARQ or ESARQ scheme.

At a given TF#i, the RRM unit computes the amount of resource to be allocated for the next transmission opportunity by adding the amount of resource requested for initial transmission, i.e. the value of the Txi parameter, with the amount of resource required to perform PDUs retransmission, i.e. the value of the ReTxi parameter. In one embodiment of the present invention, optionally, the compensation parameter is added too. As said before, the ReTxi parameter, as the number of "negatively acknowledged" in SARQ scheme or "not acknowledged" in ESARQ scheme, is computed based on the extended ARQ sliding window updated according to the last received FBI messages. Finally, the RRM unit determines the corresponding feedback resource amount to allocate to the receiver, as detailed in the following.

To keep on with the allocation of resource for retransmission and feedback information based on the extended ARQ sliding window when de-synchronization occurs, the following operations are then optionally added.

In ESARQ scheme, every PDU inside the transmitter and the extended ARQ sliding windows is considered as negatively acknowledged as long as it is not explicitly acknowledged, and thus should be retransmitted.

At the transmitter level, the resource needed to retransmit the PDUs waiting for retransmission at TF#i, i.e. the value of the ReTxi parameter, may be checked at each TF. An RRR message is delivered if the value of the ReTxi parameter is not null according to the first and third variants.

Upon reception of the RRR messages, if the number of resource units for PDU retransmissions requested by the transmitter to the RRM unit is less than the value of the ReTxi parameter determined at the RRM unit level based on the extended ARQ sliding window, i.e. the number of PDUs marked as "not acknowledged", the resource scheduled is decreased to the requested amount of resource. The Compensation parameter can then be view as the difference (as a negative quantity) between these two values.

On the contrary, if the amount of resource units for PDU retransmissions requested by the transmitter to the RRM unit is higher than the value of the ReTxi parameter determined at the RRM unit level, the resource scheduled is increased up to the requested amount of resource. By granting the resource needed by the transmitter, the transfer latency is maintained to the minimum, even if some part of resource will be likely wasted. The Compensation parameter is then computed as the difference (positive) between these two values.

However, in third variant, no augmentation of resource is performed thanks to the use of an enforced resynchronization.

The RRM unit may then send EFBI messages to the transmitter so that the transmitter ARQ sliding window can be updated, systematically (second variant), or when needed upon analysis of RRD and RRR messages, when the amount of resource requested for retransmission by the transmitter is greater than the estimated value of the ReTxi parameter (third variant). This case relies on the assumption that more useful feedback information has been received at the RRM unit level than at the transmitter level. Doing that, the RRM unit ensures that the de-synchronization of the transmitter and extended ARQ sliding windows will not increase transfer latency since less resource than requested is granted in parallel. Moreover, that can augment the reactivity of the system to perform the retransmission.

In SARQ scheme, every PDU inside the transmitter and extended ARQ sliding windows can be considered as a candidate for retransmission only if it has been explicitly negatively acknowledged by an FBI (or EFBI) message.

At the transmitter level, the capacity needed to retransmit the PDUs waiting for retransmission at TF#i (ReTxi) may be checked at each frame and a RRR message is delivered if the value of the ReTxi parameter is not null, in first variant or third variant.

Upon reception of the RRR messages, if the number of resource units for PDU retransmissions requested by the transmitter to the RRM unit is greater than the value of the ReTxi parameter determined at the RRM unit level based on the extended ARQ window (i.e. on the "negatively acknowledged" PDUs), the resource scheduled is increased up to the requested amount of resource. The Compensation parameter then represents the difference (positive) between these two values.

On the contrary, if the number of resource units for PDU retransmissions requested by the transmitter to the RRM unit is less than the value of the ReTxi parameter, determined at the RRM unit level, in first variant the resource scheduled is decreased to the requested amount of resource. That has no impact on transfer latency, but allows to allocate less resource than scheduled as it would be likely wasted otherwise or at least not used in the spirit of allocation, i.e. for retransmission of the PDUs incorrectly received. The Compensation parameter is then negative and equal to the difference between these two values. However, in third variant, no diminution of resource is performed in that case thanks to the use of enforced resynchronization.

Like in the context of ESARQ scheme, in SARQ scheme the RRM unit may send EFBI messages to the transmitter so that the transmitter ARQ sliding window can be updated if required. It can do it systematically (second variant), or when the amount of resource requested for retransmission by the transmitter is inferior to the estimated value of the ReTxi parameter (third variant).

It has to be noted that, under both considered ARQ schemes, the strict knowledge of the PDUs that are interpreted as not acknowledged is not required. It is the number of PDUs that have to be retransmitted that is required.

Moreover, when enforcing resynchronization, if some feedback information is still missing while the RDA message is correctly received, the transmitter and the extended ARQ sliding windows will remain desynchronized. However, at the next TF, a new attempt to enforce resynchronization will occur. Thus, enforcing resynchronization has not a deterministic behavior, but this scheme greatly enhances the probability that resynchronization occurs and hence reduces transfer latency.

Even with enforced synchronization using EFBI messages, some resource may still be missing at the end to retransmit PDUs not correctly received. That case occurs for example when both the transmitter and the RRM unit have lost the same FBI message(s) delivered by the receiver. However in that case, no additional delay is added because of de-synchronization.

If some RDA is lost, the resynchronization scheme will be repeated in the next TF. However, as mentioned above, this description does not address a possible lack of resources in a centralized resource allocation scheme.

Because the channel is the same for RDA and EFBI messages, if the centralized resource allocation scheme works, the probability that EFBI messages are damaged is very low.

FIGS. 2 to 7 are provided to illustrate a set of operations that can be done according to one embodiment of the present invention.

Figure 2A:
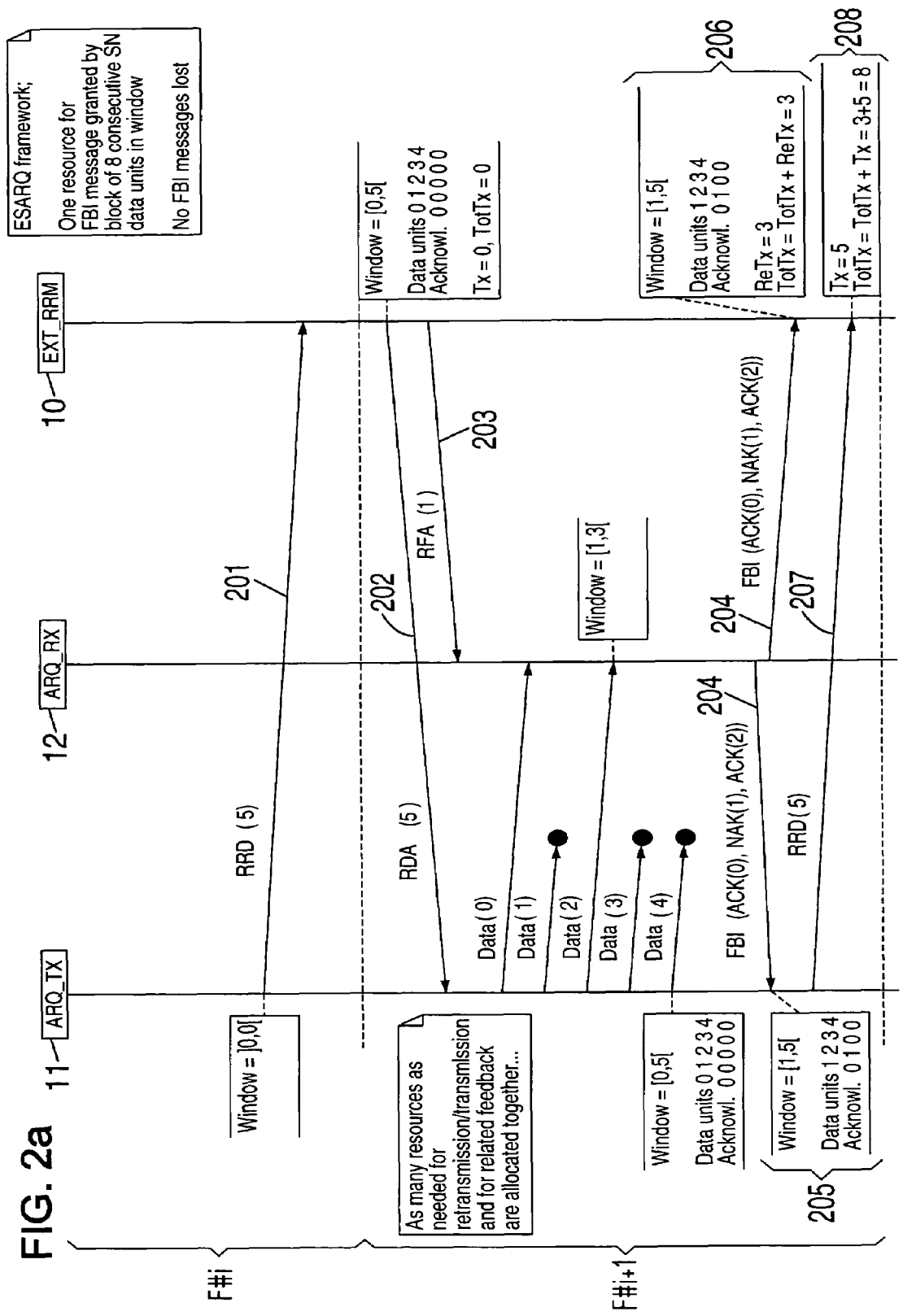
FIG. 2 illustrates one embodiment of the present invention in the context of ESARQ scheme.
Figure 2B:
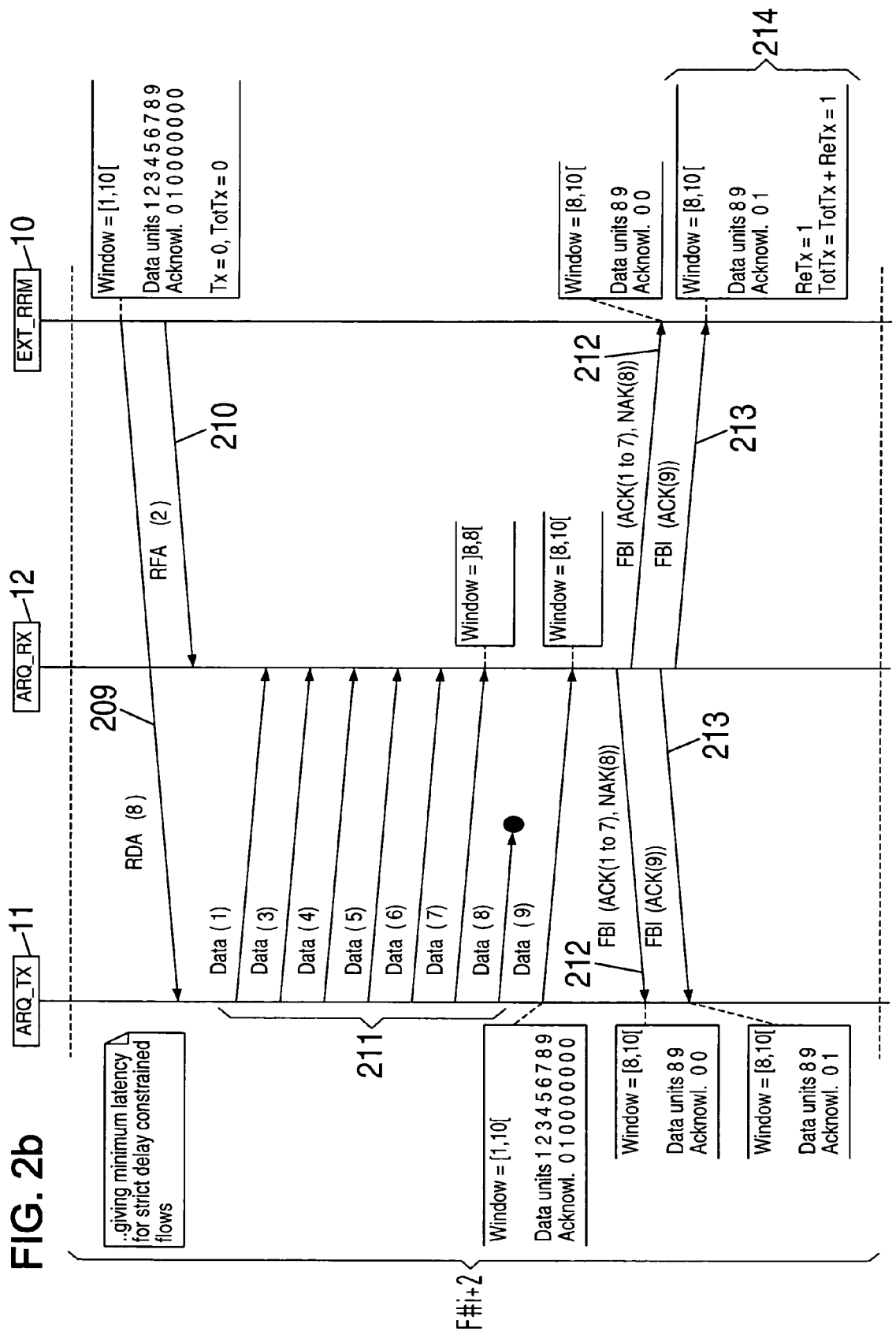
Figure 2C:
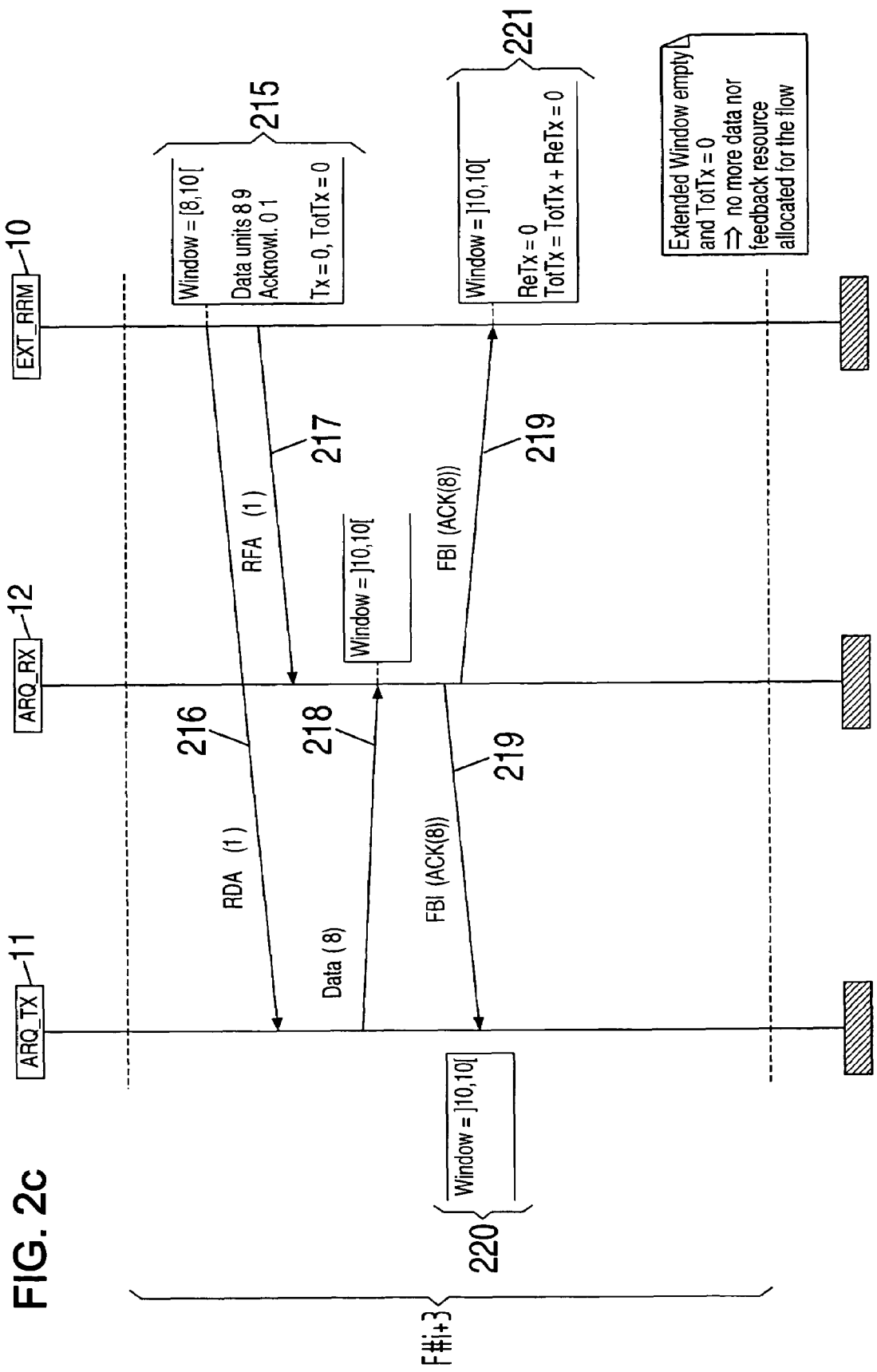

Particularly, FIG. 2 illustrates the purpose of transfer latency minimization in the context of ESARQ scheme. FIG. 2 shows messages exchange during four TFs: TF#i, TF#i+1, TF#i+2 and TF#i+3. During the TF#i, the transmitter 11 requests to the RRM unit 10 five resource units via the RRD message 201. In the next TF, the RRM unit 10 allocates to the transmitter five resource units via the RDA message 202 and allocates to the receiver enough resource units to make it able to transmit the corresponding feedback information in one TF. Assuming that the receiver sends feedback information about five resource units in one resource unit, the RRM unit 10 allocates one resource unit to the receiver via the RFA 203. For the sake of better understanding, one resource unit corresponds to the amount of resource required for transmission of one PDU.

In the same TF, TF#i+1, the transmitter transmits five PDUs, with SN equal to 0, 1, 2, 3 and 4 respectively, through the five resource units. The receiver receives correctly only two PDUs corresponding to the SN equal to 0 and equal to 2. The receiver sends an FBI message 204 to the transmitter and to the RRM unit. Upon reception of this FBI message, the transmitter and the RRM unit updates their transmitter and extended ARQ sliding window, respectively in step 205 and 206. In step 206, the RRM unit computes the amount of resource units for retransmission purpose:

ReTx=3 resource units

The transmitter requests again five resource units for the next TF via RRD message 207. In step 208, the RRM unit computes the total amount of resource unit to be allocated to the transmitter for initial transmission and retransmission:

TotTx=3+5=8 resource units

Consequently, in TF#i+2, the transmitter receives from the RRM unit a RDA message 209 allocating to it eight resource units. Simultaneously, the RRM unit allocates the corresponding resource units to the receiver via the RFA message 210. Then, the transmitter sends 8 PDUs in step 211. The receiver receives the transmitted PDUs, except PDU with the SN equal to 8. Then, the receiver sends FBI messages 212 and 213 to the RRM unit and the transmitter. At the end of the TF#i+2, the transmitter and the extended ARQ sliding window are synchronized. In step 214, the RRM unit analyses the received FBI messages and computes the amount of resource units for retransmission:

ReTx=1

As no RRD message has been received in the TF#i+2, the RRM unit allocates to the transmitter and to the receiver only one resource unit, for retransmission, via RDA message 216 and RFA message 217 respectively, in the TF#i+3. The transmitter uses this resource to retransmit PDU with the SN equal to 8, via the message 218, which is correctly received and then acknowledged via the message 219 by the receiver 12. Upon reception of FBI messages 219, the transmitter ARQ sliding window in step 220 and the extended ARQ sliding widow in step 221 are updated based on the information received via the FBI message.

FIG. 3 to FIG. 6 focus on the contribution made by the different variants in case of de-synchronization between the transmitter and the extended ARQ sliding windows. For the sake of simplification, these examples, except the one on FIG. 6, stand in the context of ESARQ scheme. However, they could be easily reproduced in SARQ scheme.

Figure 3A:
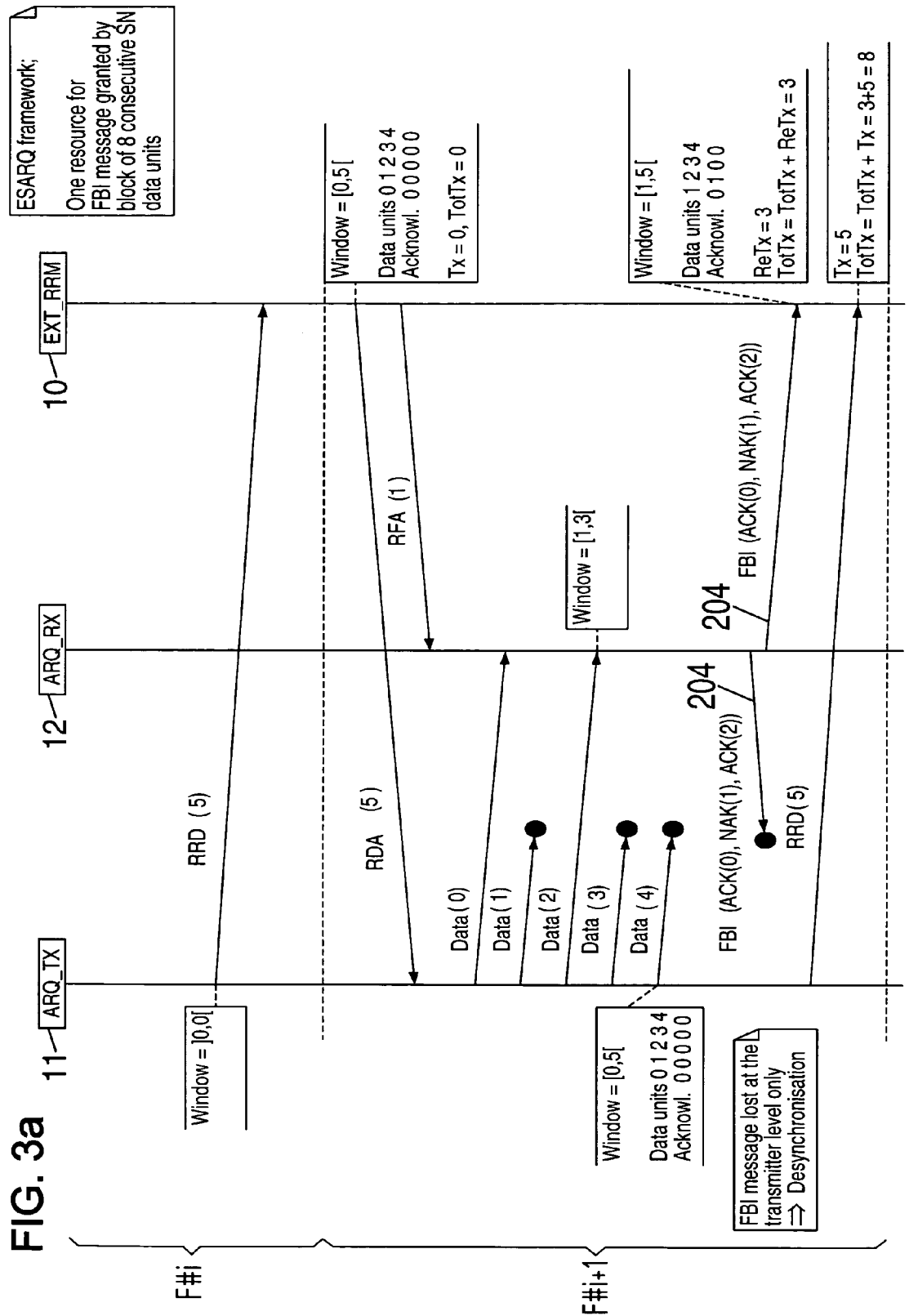
FIG. 3 illustrates an enforced automatic re-synchronization using EFBI messages in ESARQ scheme, according to one embodiment of the present invention.
Figure 3C:
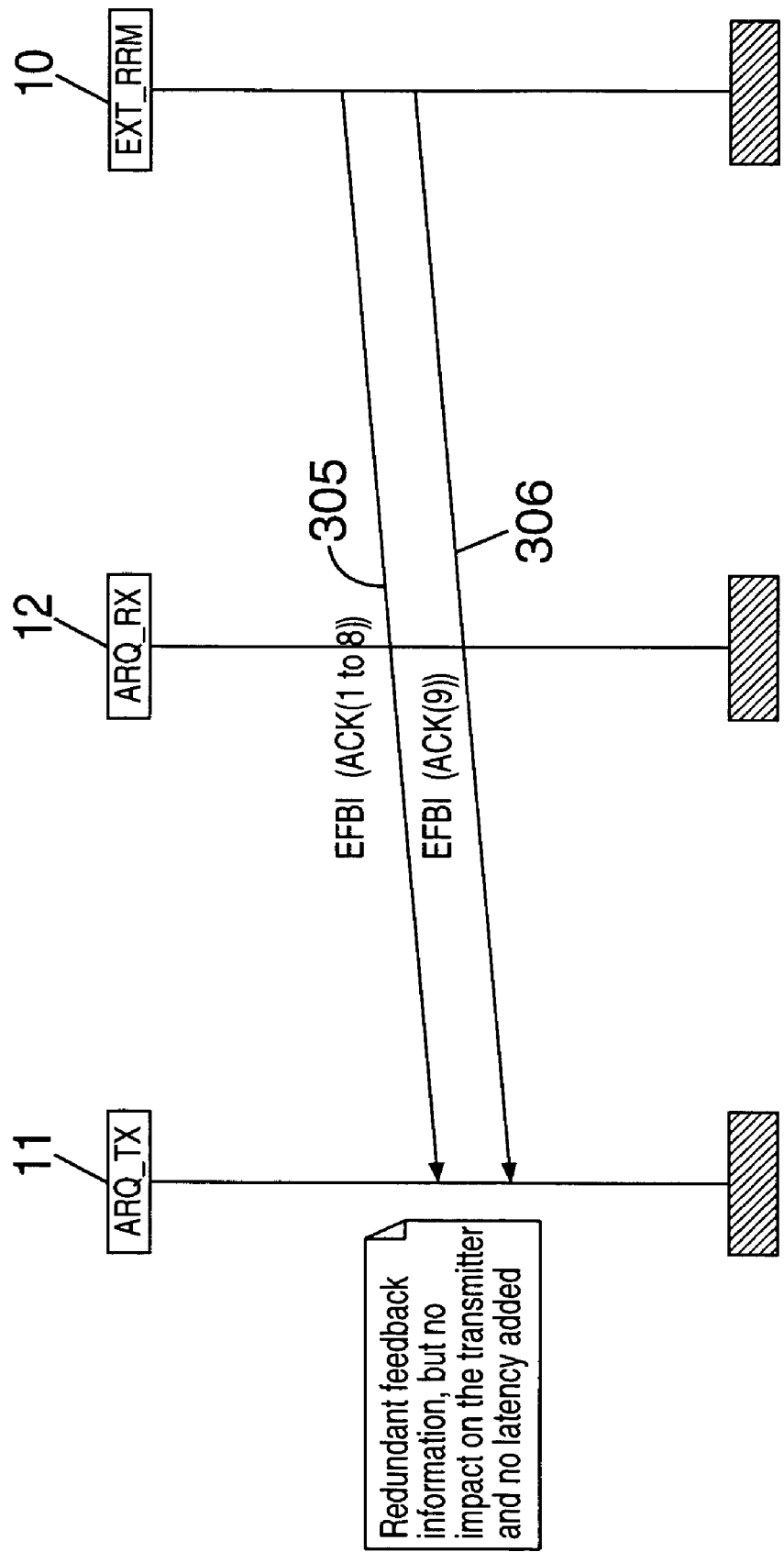

FIG. 3 illustrates an enforced automatic re-synchronization using EFBI messages in ESARQ scheme. During TF#i+1, the FBI message 204 sent by the receiver 12 is lost on the transmitter side. This is a case of de-synchronization between the transmitter and the extended ARQ sliding windows. As in FIG. 2, the RRM unit allocates eight resource units to the transmitter 11 via the RDA message 209 and allocates two resource units to the receiver via the message 210. After these resource allocations, the RRM unit sends an EFBI message 301 to re-synchronize the transmitter and the extended ARQ sliding window. This EFBI message is a replication of the FBI message 204. Then, the transmitter updates its transmitter ARQ sliding window which is again synchronized with the extended ARQ sliding window, in step 302. In this illustrated case, each FBI message received by the RRM unit is replicated in an EFBI message to be sent to the transmitter. Thus, the FBI messages 303 and 304 received by the RRM unit are replicated in EFBI messages 305 and 306 which are sent to the transmitter, even if they have already been received by the transmitter before.

Figure 4A:
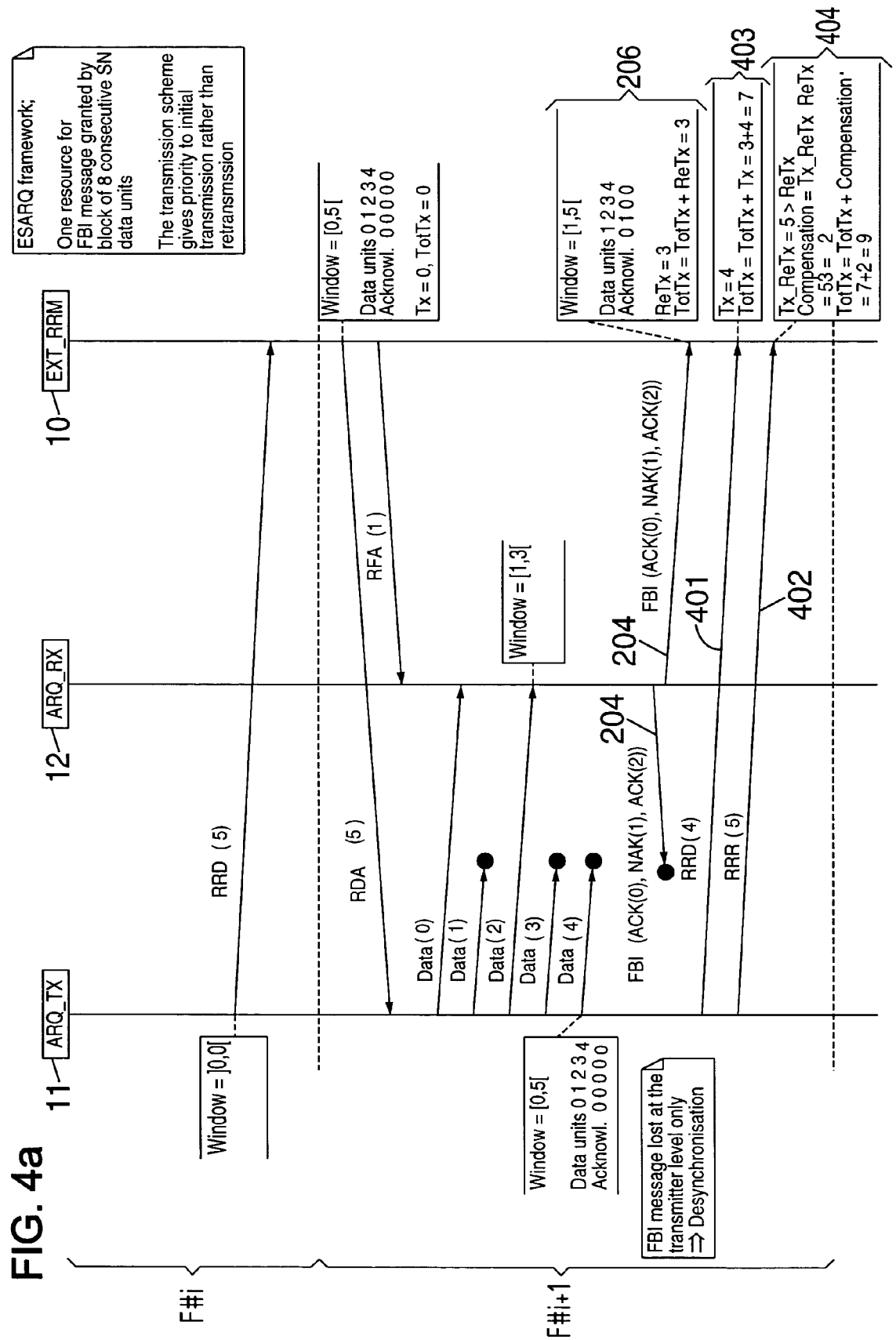
FIG. 4 illustrates a re-synchronization using RRR messages in ESARQ scheme according to one embodiment of the present invention.
Figure 4B:
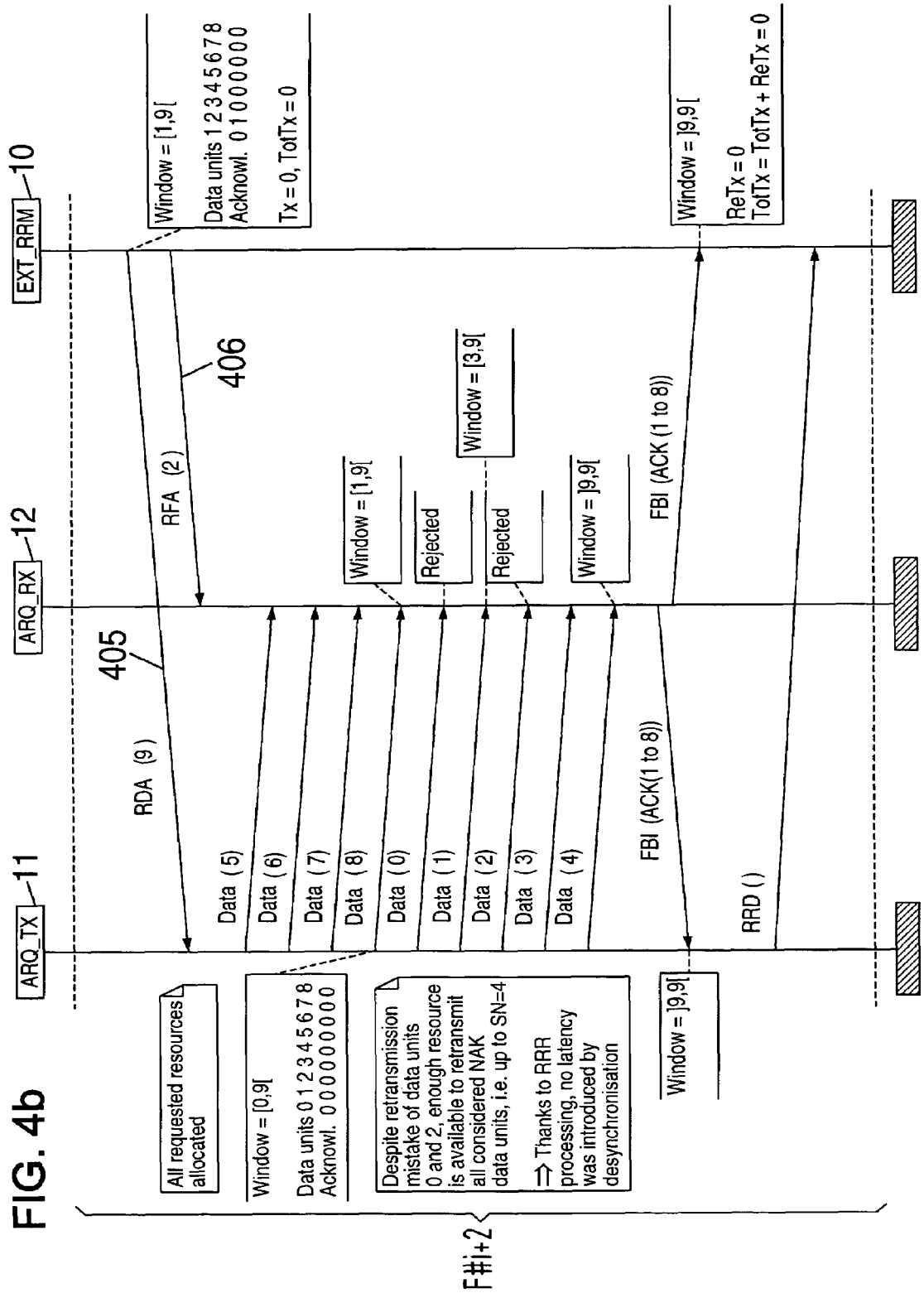

FIG. 4 illustrates a re-synchronization using RRR messages in ESARQ scheme. In this illustrated example, as in FIG. 3, the FBI message 204 in the TF#i+1 is lost by the transmitter but not by the RRM unit. In step 206, upon reception of the FBI message, the RRM unit computes the amount of resource units to be allocated, which equal to three resource units. The transmitter sends an RRD message 401 for requesting four resource units for initial PDUs transmission and an RRR message 402 for requesting five resource units for PDUs retransmission. Upon reception of the RRD message 401, the RRM unit computes the amount of resource units to be allocated to the transmitter in step 403, which is equal to seven resource units, i.e. three resource units for retransmission and four resource units for initial transmission. Upon reception of the RRR message 402, the RRM unit detects a de-synchronization of ARQ sliding windows on comparison between the amount of resource units for retransmission computed by the RRM unit, in step 206, corresponding to the value of the parameter ReTx equal to three, and the amount of resource units requested by the transmitter, which is equal to five resource units. Then, in step 404, the RRM unit computes a compensation parameter equal to the difference between both values of amount of resource, in this example, the compensation parameter is equal to two resource units. The value of this compensation parameter is added to the amount of resource to be allocated. Consequently, the RRM unit allocates to the transmitter nine resource units via the RDA message 405. The amount of resource units thus allocated corresponds to the amount of resource units requested by the transmitter 11 via the RRD and the RRR messages, respectively 401 and 402. The RRM unit allocates simultaneously, in the same TF, the corresponding resource units to the receiver via the RFA message 406.

Figure 5A:
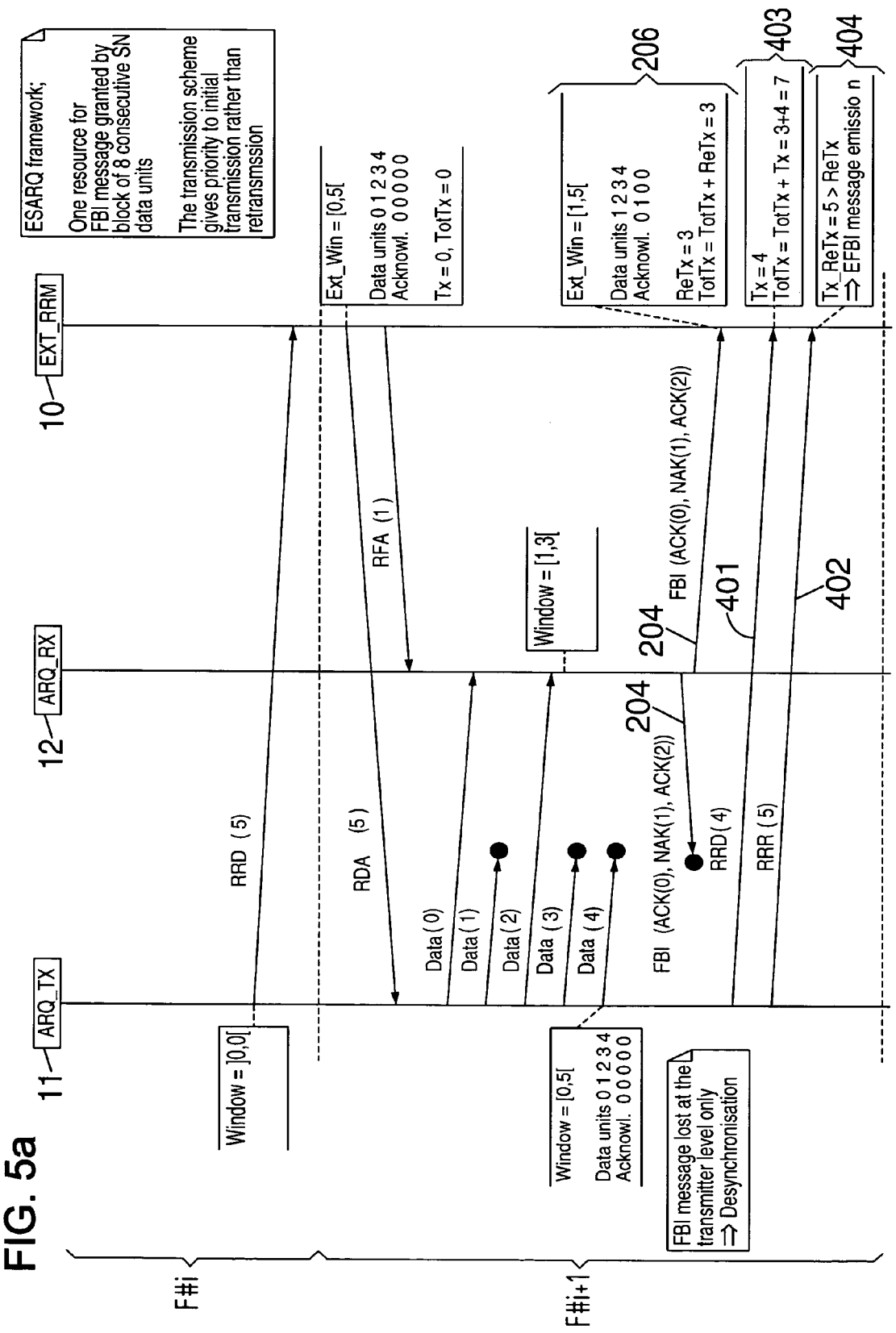
FIG. 5 illustrates an optimal re-synchronization process using both RRR and EFBI messages in ESARQ scheme according to one embodiment of the invention.

FIG. 5 illustrates an optimal re-synchronization process using both RRR and EFBI messages in ESARQ scheme. In this example, as in FIG. 4, the RRM unit detects a de-synchronization of the ARQ sliding windows upon reception of the RRR message 402 comprising five requested resource units. In the next TF, the RRM unit allocates seven resource units via the RDA message 500, as computed in step 403. Moreover, in this embodiment, because the amount of resource for retransmission requested by the transmitter is greater than the amount of resource for retransmission computed by the RRM unit, the RRM unit enforces the re-synchronization by sending to the transmitter an EFBI message 502, which is a replication of the last received FBI message 204. In one embodiment, each time such a de-synchronization is detected, the RRM unit sends to the transmitter an EFBI message. Upon reception of this EFBI message, the transmitter ARQ sliding window is updated in step 503. So, PDUs corresponding to reference numbers equal to 0 and 2 are not badly selected for retransmission in this case. On the contrary, in the case illustrated in FIG. 4, even if PDUs corresponding to the reference numbers equal to 0 and 2 are correctly received by the receiver in the TF#i+1, they are retransmitted by the transmitter to the receiver in the TF#1+2.

Figure 6A:
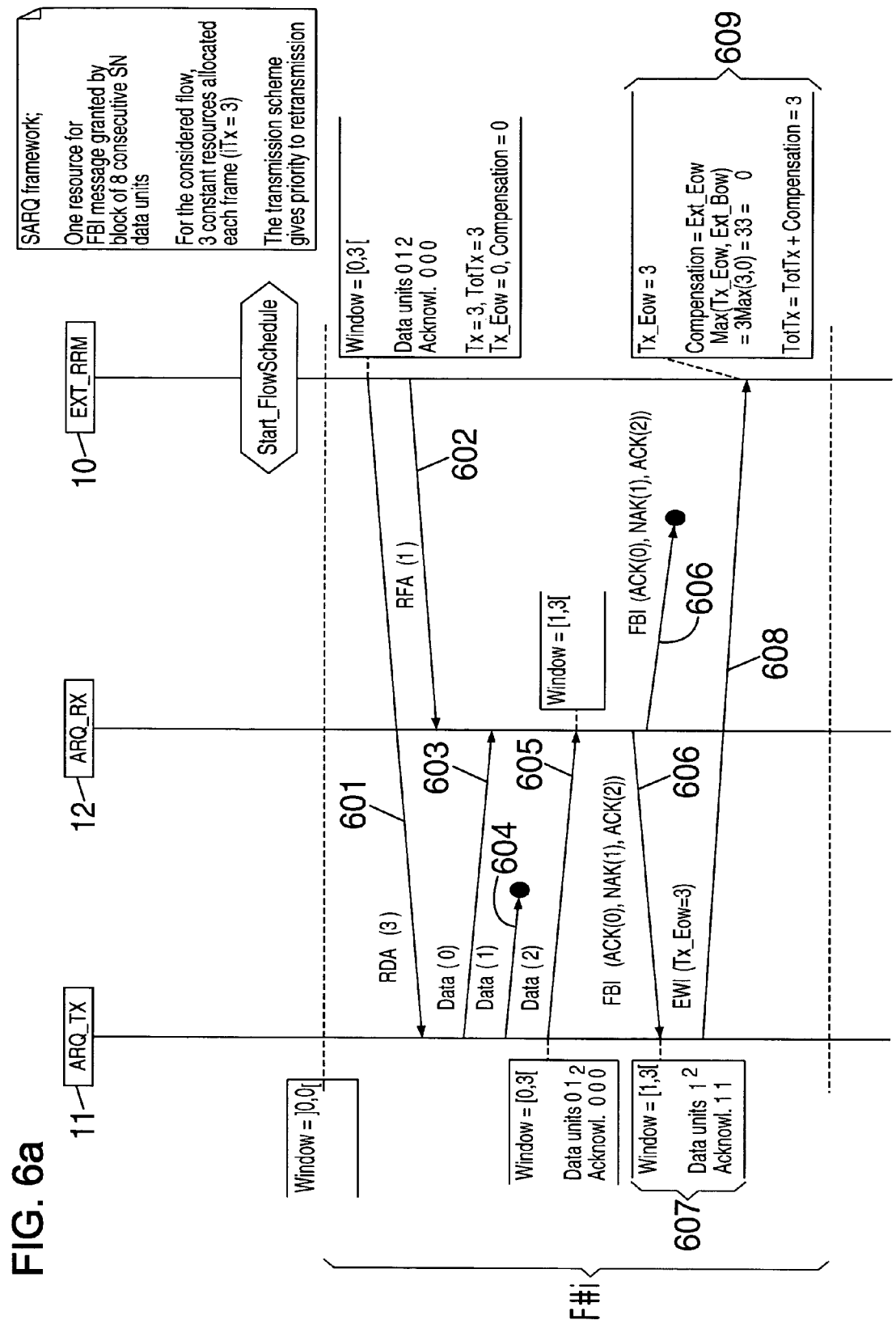
FIG. 6 illustrates a re-synchronization using EWI messages in SARQ scheme according to one embodiment of the present invention.
Figure 6B:
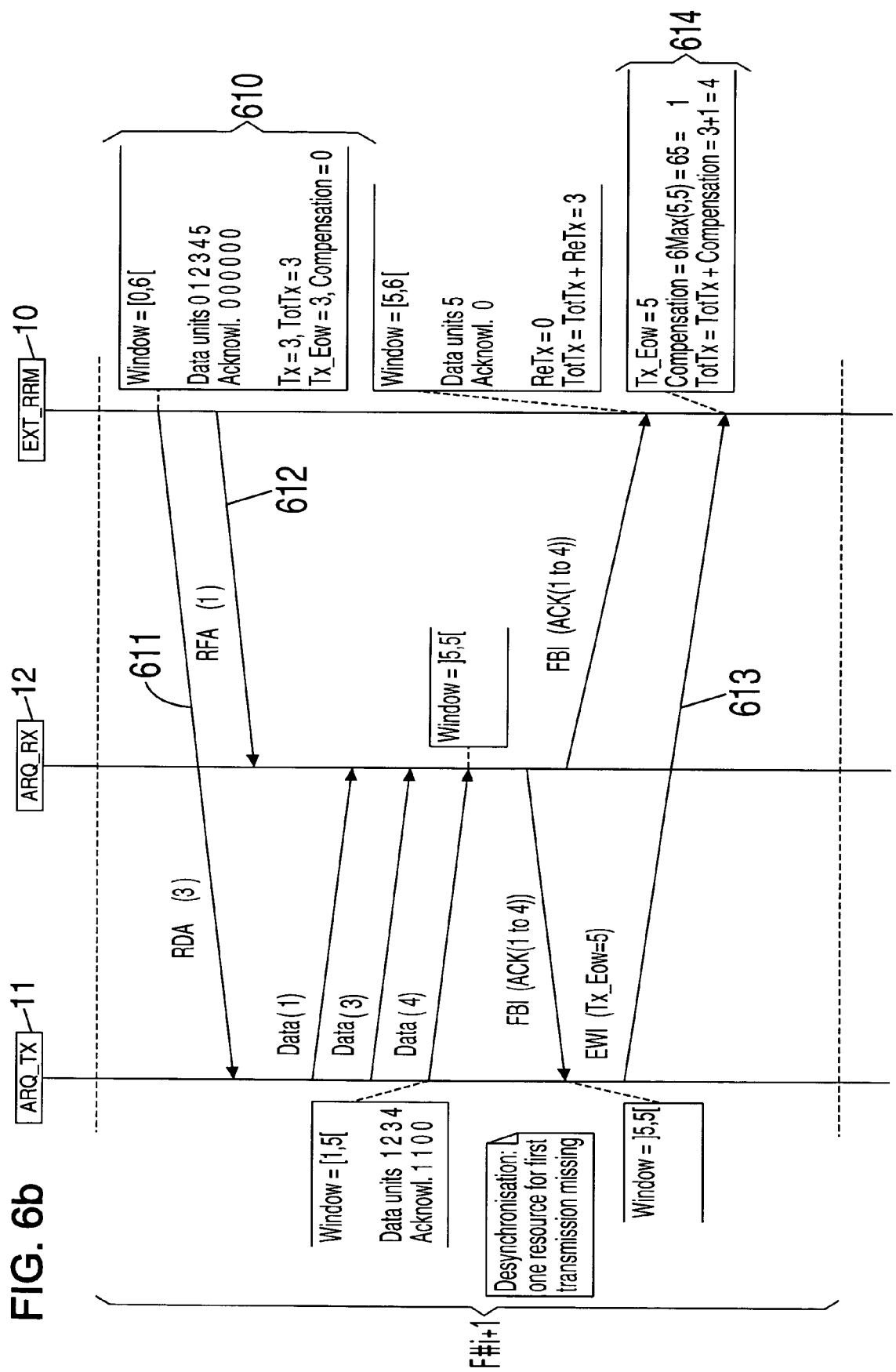

FIG. 6 illustrates a re-synchronization using EWI messages in SARQ scheme, the transmitter sends an EWI message each time the end of the transmitter ARQ sliding window is updated. In this example, the RRM unit allocates to the transmitter three resource units and one resource unit to the receiver in each TF, respectively via the RDA message 601 and the RFA message 602. During TF#i, the transmitter sends 3 PDUs using the allocated resource units, via the messages 603, 604 and 605. The receiver receives these PDUs except the PDU with SN equal to 1 sent in the message 604. Then, the receiver sends to the RRM unit and to the transmitter the FBI message 606. This message is lost on the RRM unit side. On the other hand, the transmitter updates its ARQ sliding window in step 607 and then sends the EWI message 608 to the RRM unit. In step 609, the RRM unit checks possible de-synchronization by comparing the end of window received in the EWI message 608 and the end of the extended ARQ sliding window and accordingly computes a compensation parameter. At this level, compensation parameter is null. Then, the RRM unit computes the amount of resource units to be allocated based on the extended ARQ sliding window, which is equal to three.

In the next TF, the RRM unit sends the RDA message 611 and the RFA message 612. In step 614, the RRM unit detects a de-synchronization by comparing the end of window received in the EWI message 613 and the end of the extended ARQ sliding window. The RRM unit also computes the compensation parameter that equals one, in step 614. Upon this compensation value the RRM unit allocates one unit more than computed initially, i.e. four units. More generally, upon reception of the EWI message 616 in the TF#i+2, the RRM unit computes the compensation parameter in step 617, and computes the next amount of resource units to be allocated accordingly in step 618.

Figure 7A:
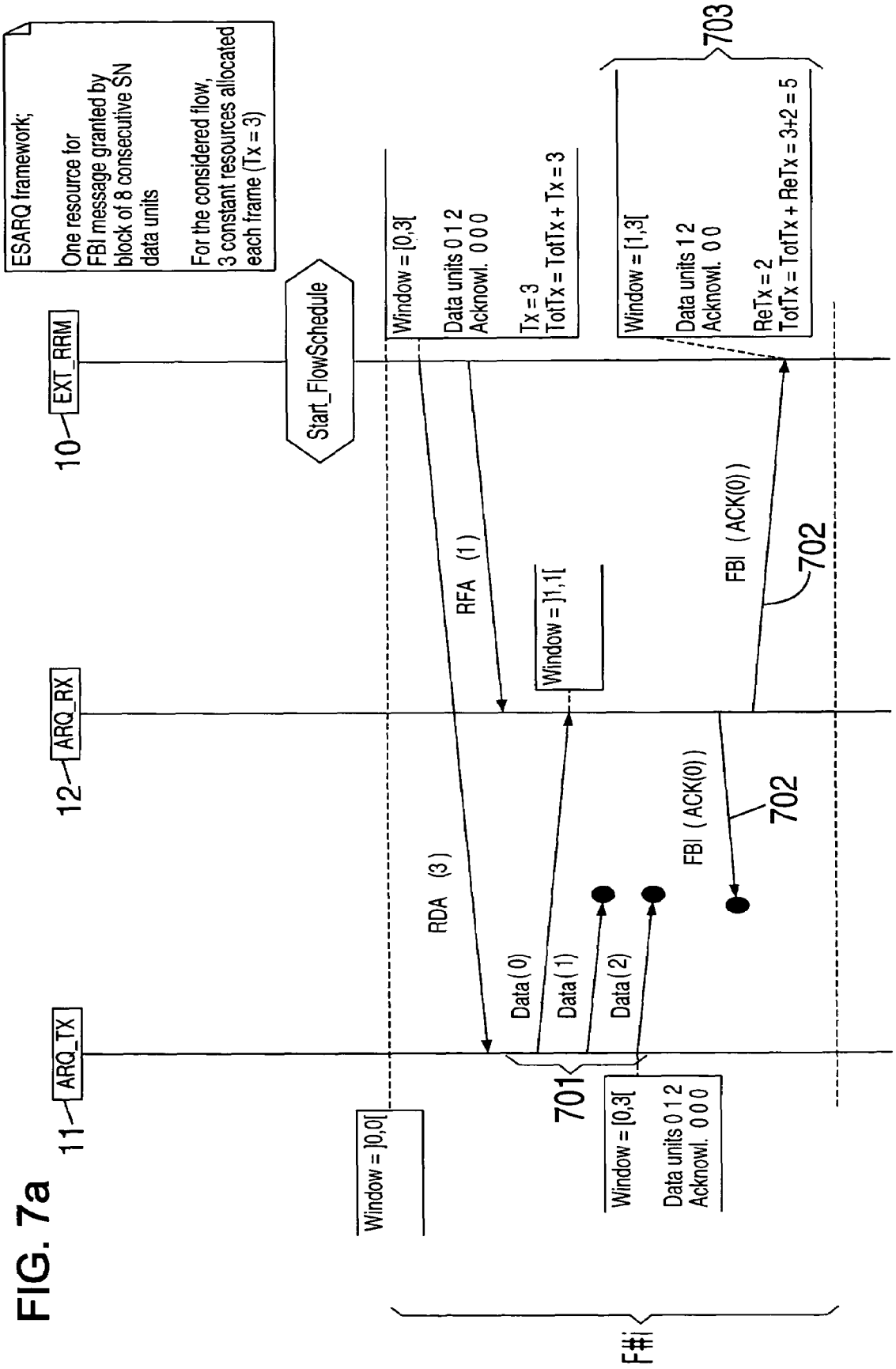
FIG. 7 shows in ESARQ scheme a re-synchronization between the transmitter and the extended ARQ sliding windows.
Figure 7B:
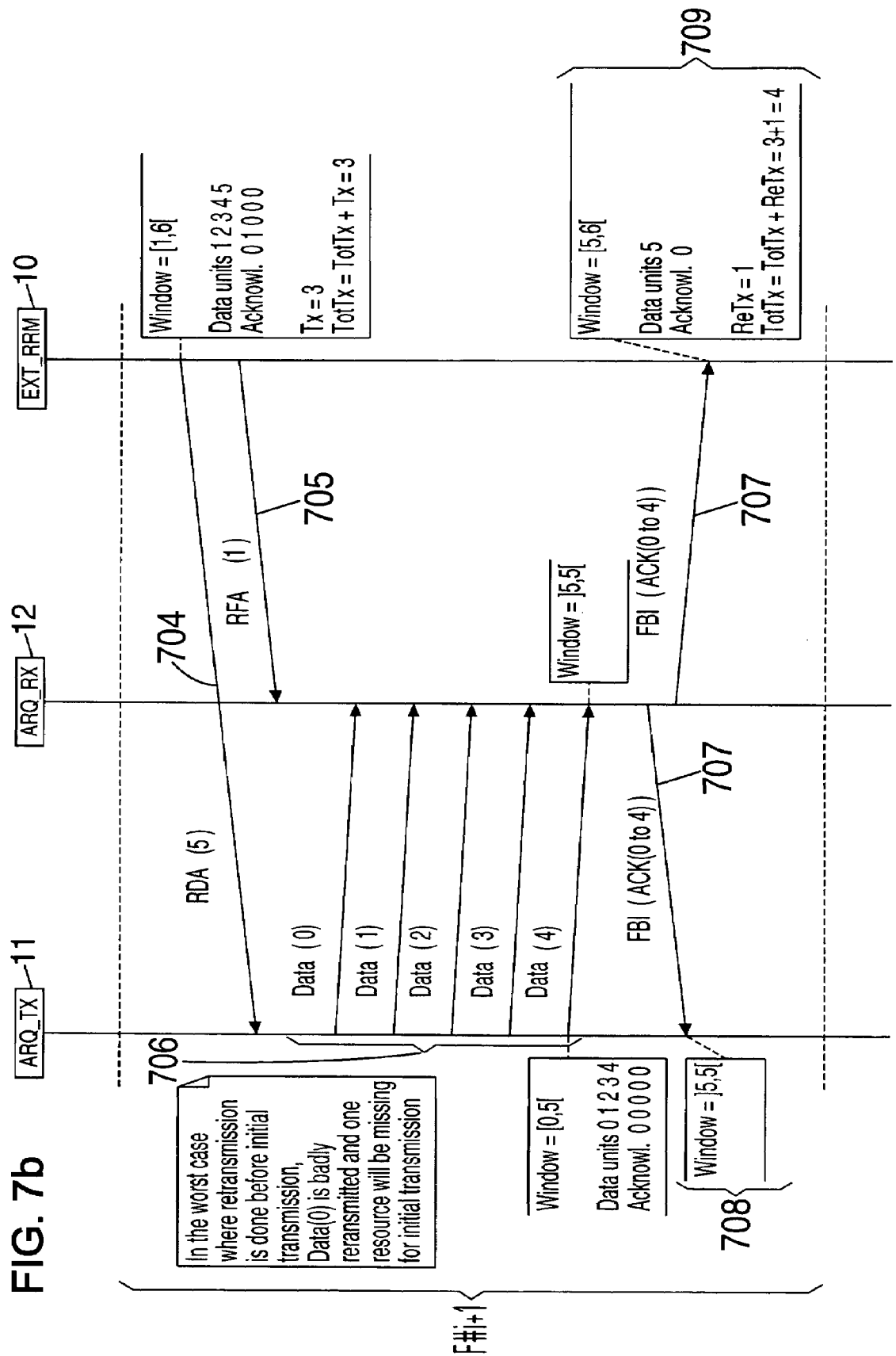

Finally, FIG. 7 shows that in ESARQ scheme, if the transmitter and the extended ARQ sliding windows are de-synchronized, even if the specific signaling messages as RRR, EWI and EFBI messages, and related operation presented in this invention for reducing the duration of the de-synchronization are not used, a re-synchronization occurs upon FBI messages only. In this example, the RRM unit allocates automatically three resource units for initial transmission to the transmitter each TF. During TF#i, the transmitter uses these three resource units sending three PDUs with the SN equal to 0, 1 and 2, in step 701. The receiver receives only the PDU with SN equal to 0 and then, it sends an FBI message 702 to the transmitter and to the RRM unit. Accordingly, the RRM unit updates the extended ARQ sliding window in step 703. This FBI message 702 is lost on the transmitter side. Consequently, the transmitter and the extended ARQ sliding window are de-synchronized. To allocate resource units for the next TF, TF#i+1, the RRM unit computes the resource units based on the extended ARQ sliding window. The RRM unit sends a RDA message 704 and a RFA message 705. As five resource units are allocated to the transmitter for TF#i+1, the transmitter transmits five PDUs in step 706. Upon reception, the receiver sends an FBI message 707 to acknowledge positively these five PDUs. Upon reception of this FBI message 707, the transmitter and the extended ARQ sliding window are updated in step 708 and 709 respectively. Both ARQ sliding window on the transmitter and on the RRM unit side are still de-synchronized. The RRM unit computes the amount of resource units for the transmitter based on the extended ARQ sliding window, in step 710. Consequently, four resource units are allocated to the transmitter via the RDA message 711. Then, the transmitter sends four PDUs according to its transmitter ARQ sliding window, in step 712. Upon reception of these PDUs, the receiver sends an FBI message 713 which is correctly received on the RRM unit side and on the transmitter side. Both ARQ sliding window are updated accordingly in step 714 and 715. At this point, both ARQ sliding window are again synchronized.

When the RRM unit is co-located with the transmitter, the extended ARQ sliding window and the transmitter ARQ sliding window are merged in one window. Then, there is no desynchronization issue anymore between both ARQ sliding windows. In this context, the EFBI or EWI messages are useless. RRD and RRR become internal variables or messages.

When the RRM unit is co-located with the receiver, the extended ARQ sliding window and the receiver ARQ sliding window are merged in one window. There is no check/analysis of feedback Information at the RRM unit level anymore. However, the schemes that induce resynchronization of the both ARQ sliding windows, if some feedback information is lost, can still apply.

In figures described above, when forward resource and feedback resource are comprised in a same TF, feedback resource is allocated and used in association with forward resource which is in the same TF. The present invention encompasses other TF structure, and notably, a TF structure where feedback resource comprised in a TF can correspond to forward resource comprised in a previous TF.

In one embodiment of the present invention, in this last TF structure, where a current TF comprises feedback resource which corresponds to forward resource of a TF preceding the current TF, the RRM unit computes and allocates an amount of feedback resource in the current TF before updating the end of the extended ARQ sliding window.

In one embodiment of the present invention, in an other type of TF structure, where a current TF comprises forward resource and feedback resource which corresponds to forward resource of the current TF, the RRM unit computes and allocates an amount of feedback resource in the current TF after updating the end of the extended ARQ sliding window.

One embodiment of the present invention can be advantageously integrated in an EC unit in order to increase the reactivity of the Link Layer while minimizing the cost of signaling overhead or waste of resource. Such a method according one embodiment can be based on two state variables only: the amount of resource for initial transmission and the extended ARQ window, which can be stored in a RAM. The amount of resource for retransmission does not need explicit handling. The resource allocation policy that is determined by the RRM unit does not require to be communicated to the transmitter or the receiver. This feature avoids adding specific signaling messages or fields in already existing FBI messages. Moreover, it allows to be implemented in any defined standard.

Only the way the extended ARQ window is updated varies according the location of the RRM unit. Advantageously, the proposed scheme is also robust against signaling message loss. The proposed mechanism can be profitably adapted to networks that implement a centralized MAC protocol and an EC unit based on a selective ARQ scheme. It can be applied to any type of data transfer whatever the topology is. It can be used in a cellular network where data flows are emitted from or toward an Access Point (AP) that integrates the RRM unit. It can also be applied to networks that support direct communications between devices such as Home Networks.

Any wireless systems or Power Line Communications (PLC) networks, which rely on an unreliable PHY medium and support a great number of concurrent applications with variable requirements along the time, are typical examples of systems where the invention could be of fundamental interest.

The invention claimed is:

1. A method of resource allocation in a network containing at least one transmitter associated to a transmitter ARQ unit, and configured to transmit PDUs according to an ARQ protocol, at least one receiver associated to a receiver ARQ unit, and configured to receive said transmitted PDUs and to acknowledge each of said PDUs by sending back to said transmitter one or more FeedBack Information (FBI) messages containing feedback acknowledgement status information indicating correct or incorrect reception of said transmitted PDUs, and a Radio Resource Management (RRM) unit configured to allocate resources to at least one of said transmitter and receiver based on a TDMA scheme providing a series of Time Frames (TFs), the method comprising:

transmitting PDUs from said transmitter ARQ unit to said receiver and managing a transmitter ARQ sliding window having a bottom end corresponding to the oldest transmitted PDU not yet acknowledged and a top end corresponding to the next PDU to be transmitted;

managing, upon reception of said PDUs by said receiver ARQ unit, a receiver ARQ sliding window having a bottom end corresponding to the oldest PDU not yet correctly received and a top end corresponding to the last correctly received PDU;

sending back, after reception by said receiver ARQ unit of said PDUs, the FBI message or messages to the transmitter; and updating said transmitter ARQ sliding window according to feedback acknowledgement status information in said FBI message received by said transmitter ARQ unit; and retransmitting PDUs interpreted as not correctly received by the receiver based on said transmitter ARQ sliding window thus updated;

receiving, using the RRM unit, said FBI messages and managing, using the RRM unit, an extended ARQ sliding window having a bottom end updated according to the feedback acknowledgement status information and a top end updated according to an amount of resources computed by the RRM unit for initial PDUs transmission; and allocating, using the RRM unit, at least one of an amount of forward resources to the transmitter for initial PDUs transmission, an amount of forward resources to the transmitter for PDUs retransmission, and an amount of feedback resources to the receiver for sending back the FBI messages, said amount of forward resources and said amount of feedback resources computed based on said extended ARQ sliding window.

2. The method according to claim 1, further comprising:

managing, using the RRM unit, the extended ARQ sliding window on a per TF basis by requesting an amount of resources corresponding to a number n of PDUs for the transmitter for initial PDUs transmission, updating the top end of the extended ARQ sliding window according to said number n, and updating the bottom end of the extended ARQ sliding window upon reception of the FBI message or messages.

3. The method of claim 2, further comprising:

computing and allocating, using the RRM unit, an amount of feedback resources in a current TF before updating the top end of the extended ARQ sliding window when said feedback resource corresponds to forward resource of a TF preceding said current TF, and computing and allocating, using the RRM unit, the amount of feedback resource in a current TF after updating the top end of the extended ARQ sliding window when said feedback resource corresponds to forward resource of said current TF.

4. The method according to claim 1, further comprising:

allocating, using the RRM unit, to the transmitter an amount of forward resources requested by the transmitter.

5. The method according to claim 1, further comprising:

associating, using the transmitter, a feedback acknowledgment status flag according to the ARQ protocol with each PDU in the transmitter ARQ sliding window and retransmitting, using the transmitter, the PDUs associated with the feedback acknowledgement status flag indicating a not correct reception.

6. The method according to claim 5, further comprising:

storing, using the RRM unit, in the extended ARQ sliding window the feedback acknowledgement status flag from the received FBI messages, and computing and allocating, using the RRM unit, an amount of forward resources to the transmitter, according to said feedback acknowledgement status flag stored in the extended ARQ sliding window, and an amount of feedback resources to the receiver so that the extended ARQ window could be acknowledged.

7. The method according to claim 1, further comprising:

sending, using the RRM unit, one or more Enforced FeedBack Information (EFBI) messages to the transmitter upon reception of one or more FBI messages, said EFBI message being built from the last received FBI message or messages or being built from the extended ARQ sliding window, according to a determined criterion.

8. The method according to claim 1, further comprising:

sending, using the transmitter, a Resource Request for Retransmission (RRR) message to the RRM unit containing an amount of resources required for PDUs retransmission;

updating, using the RRM unit, the extended ARQ sliding window based on said amount of resources required for PDUs retransmission; and computing, using the RRM unit, the amount of resources to be allocated based on the extended ARQ sliding window.

9. The method according to claim 1, wherein the ARQ protocol is an Extended Selective ARQ (ESARQ) protocol, and further comprising:

setting a feedback acknowledgement status flag associated to a PDU of the extended ARQ sliding window to "not acknowledged" upon transmission of said PDU or upon reception of a negative acknowledgement for said PDU via an FBI message, and setting the feedback acknowledgement status flag associated to the PDU of the extended ARQ sliding window to "acknowledged" upon reception of a positive acknowledgement for said PDU via an FBI message.

10. The method according to claim 1, further comprising: sending, using the transmitter, an End of Window Indication (EWI) message to the RRM unit containing the top end of the transmitter ARQ sliding window, after initial PDU transmission, for synchronizing the top end of the transmitter ARQ sliding window and the extended ARQ sliding window.

11. The method according to claim 1, further comprising: co-localizing at least one of the transmitter ARQ unit and the receiver ARQ unit with the RRM unit.

12. A method of resource allocation in a network containing at least one transmitter associated to a transmitter ARQ unit, and configured to transmit PDUs according to an ARQ protocol, at least one receiver associated to a receiver ARQ unit, and configured to receive said transmitted PDUs and to acknowledge each of said PDUs by sending back to said transmitter one or more FeedBack Information (FBI) messages containing feedback acknowledgement status information indicating correct or incorrect reception of said transmitted PDUs, and a Radio Resource Management (RRM) unit configured to allocate resources to at least one of said transmitter and receiver based on a TDMA scheme providing a series of Time Frames (TFs), the method comprising:
  transmitting PDUs from said transmitter ARQ unit to said receiver and managing a transmitter ARQ sliding window having a bottom end corresponding to the oldest transmitted PDU not yet acknowledged and a top end corresponding to the next PDU to be transmitted;
  managing, upon reception of said PDUs by said receiver ARQ unit, a receiver ARQ sliding window having a bottom end corresponding to the oldest PDU not yet correctly received and a top end corresponding to the last correctly received PDU;
  sending back, after reception by said receiver ARQ unit of said PDUs, the FBI message or messages to the transmitter; and
  updating said transmitter ARQ sliding window according to feedback acknowledgement status information in said FBI message received by said transmitter ARQ unit; and
  retransmitting PDUs interpreted as not correctly received by the receiver based on said transmitter ARQ sliding window thus updated;
  receiving, using the RRM unit, said FBI messages and managing, using the RRM unit, an extended ARQ sliding window having a bottom end updated according to the feedback acknowledgement status information and a top end updated according to an amount of resources computed by the RRM unit for initial PDUs transmission;
  allocating, using the RRM unit, at least one of an amount of forward resources to the transmitter for initial PDUs transmission, an amount of forward resources to the transmitter for PDUs retransmission, and an amount of feedback resources to the receiver for sending back the FBI messages, said amount of forward resources and said amount of feedback resources computed based on said extended ARQ sliding window;
  sending, using the transmitter, a Resource Request for Retransmission (RRR) message to the RRM unit containing an amount of resources required for PDUs retransmission;
  updating, using the RRM unit, the extended ARQ sliding window based on said amount of resources required for PDUs retransmission;
  computing, using the RRM unit, the amount of resources to be allocated based on the extended ARQ sliding window;
  sending, using the transmitter, a Resource Request for Retransmission (RRR) message to the RRM unit containing an amount of resources required for PDUs retransmission;
  comparing, using the RRM unit, the amount of resources requested in said RRR message with the amount of resources for PDUs retransmission computed from the current extended ARQ sliding window;
  sending upon said comparison by the RRM unit of an EFBI message to the transmitter when said amount of resources requested and said amount of resources computed are different; and
  allocating, using the RRM unit, an amount of resources selected among the amount of resources requested and the amount of resources computed, according to a characteristic of the ARQ protocol.

13. The method according to claim 9, further comprising: allocating, using the RRM unit, the amount of resources which is the lowest one among the amount of resources requested and the amount of resources computed.

14. The method according to claim 12, wherein the ARQ protocol is a Selective ARQ (SARQ) protocol, and further comprising:
  setting a feedback acknowledgement status flag associated to a PDU of the extended ARQ sliding window to "acknowledged" upon reception of a positive acknowledgement via an FBI message,
  setting the feedback acknowledgement status flag to "negatively acknowledged" upon reception of a negative acknowledgement, and
  setting the feedback acknowledgement status flag to "not acknowledged" upon initial transmission or retransmission of said PDU.

15. The method according to claim 14, further comprising: allocating, using the RRM unit, the amount of resources which is the greatest one among the amount of resources requested and the amount of resources computed.

16. A method of resource allocation in a network containing at least one transmitter associated to a transmitter ARQ unit, and configured to transmit PDUs according to an ARQ protocol, at least one receiver associated to a receiver ARQ unit, and configured to receive said transmitted PDUs and to acknowledge each of said PDUs by sending back to said transmitter one or more FeedBack Information (FBI) messages containing feedback acknowledgement status information indicating correct or incorrect reception of said transmitted PDUs, and a Radio Resource Management (RRM) unit configured to allocate resources to at least one of said transmitter and receiver based on a TDMA scheme providing a series of Time Frames (TFs), the method comprising:
  transmitting PDUs from said transmitter ARQ unit to said receiver and managing a transmitter ARQ sliding window having a bottom end corresponding to the oldest transmitted PDU not yet acknowledged and a top end corresponding to the next PDU to be transmitted;
  managing, upon reception of said PDUs by said receiver ARQ unit, a receiver ARQ sliding window having a bottom end corresponding to the oldest PDU not yet correctly received and a top end corresponding to the last correctly received PDU;
  sending back, after reception by said receiver ARQ unit of said PDUs, the FBI message or messages to the transmitter;

updating said transmitter ARQ sliding window according to feedback acknowledgement status information in said FBI message received by said transmitter ARQ unit; and retransmitting PDUs interpreted as not correctly received by the receiver based on said transmitter ARQ sliding window thus updated;

receiving, using the RRM unit, said FBI messages and managing, using the RRM unit, an extended ARQ sliding window having a bottom end updated according to the feedback acknowledgement status information and a top end updated according to an amount of resources computed by the RRM unit for initial PDUs transmission;

allocating, using the RRM unit, at least one of an amount of forward resources to the transmitter for initial PDUs transmission, an amount of forward resources to the transmitter for PDUs retransmission, and an amount of feedback resources to the receiver for sending back the FBI messages, said amount of forward resources and said amount of feedback resources computed based on said extended ARQ sliding window;

sending, using the transmitter, an End of Window Indication (EWI) message to the RRM unit containing the top end of the transmitter ARQ sliding window, after initial PDU transmission, for synchronizing the top end of the transmitter ARQ sliding window and the extended ARQ sliding window;

detecting, using the RRM unit, when an FBI message has been lost on the transmitter side by comparing the top end of the transmitter ARQ sliding window contained in the EWI message and the top end of the extended ARQ sliding window; and updating upon said detection by the RRM unit of the extended ARQ sliding window accordingly, before computing the next amount of forward resources to be allocated from the extended ARQ sliding window thus updated.

17. A network communication system comprising at least one transmitter associated to a transmitter ARQ unit, at least one receiver associated to a receiver ARQ unit, and a Radio Resource Management (RRM) unit, said transmitter comprising:
a first transmission unit configured to transmit PDUs according to an ARQ protocol;

said receiver comprising:
a first receiver unit configured to receive said transmitted PDUs, and
an acknowledgement unit configured to acknowledge each of said PDUs by sending back to said transmitter one or more FeedBack Information (FBI) messages containing feedback acknowledgement status information indicating correct or incorrect reception of said transmitted PDUs;

said RRM unit comprising:
a first allocation unit configured to allocate resources to at least one of said transmitter and receiver based on a TDMA scheme providing a series of Time Frames (TFs),
a second receiver unit configured to receive said FBI messages,
a first management unit configured to manage an extended ARQ sliding window having a bottom end updated according to the feedback acknowledgement status information and a top end updated according to an amount of resources computed by the RRM unit for initial PDUs transmission, and
a second allocation unit configured to allocate at least one of an amount of forward resources to the transmitter for initial PDUs transmission, an amount of forward resources to the transmitter for PDUs retransmission, and an amount of feedback resources to the receiver for sending back the FBI messages, said amount of forward resources and said amount of feedback resources computed based on said extended ARQ sliding window;

said transmitter ARQ unit comprising:
a second transmission unit configured to transmit PDUs to the receiver,
a second management unit configured to manage a transmitter ARQ sliding window having a bottom end corresponding to oldest transmitted PDU not yet acknowledged and a top end corresponding to the next PDU to be transmitted,
an updating unit configured to update said transmitter ARQ sliding window according to feedback acknowledgement status information in said FBI message received by said transmitter ARQ unit, and
retransmission means, for retransmitting PDUs interpreted as not correctly received by the receiver based on said transmitter ARQ sliding window thus updated;

said receiver ARQ unit comprising:
a third management unit configured to manage, upon reception of the PDUs, a receiver ARQ sliding window having a bottom end corresponding to the oldest PDU not yet correctly received and a top end corresponding to the last correctly received PDU, and
a sending back unit, configured to send back, after reception of the PDUs, FBI message or messages to the transmitter.

* * * * *